United States Patent
Tanaka et al.

(12)

(10) Patent No.: US 6,605,924 B2
(45) Date of Patent: *Aug. 12, 2003

(54) FUNCTION EXPANSION DEVICE FOR A PORTABLE ELECTRONIC DEVICE

(75) Inventors: Shiro Tanaka; Masuo Ohnishi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/283,307

(22) Filed: Apr. 1, 1999

(65) Prior Publication Data

US 2002/0008497 A1 Jan. 24, 2002

(30) Foreign Application Priority Data

Sep. 14, 1998 (JP) ............................. 10-260602

(51) Int. Cl.⁷ .............................. H02J 7/00; G06F 3/10; G06F 1/16
(52) U.S. Cl. ..................... 320/113; 361/683; 708/140
(58) Field of Search ........................ 320/113; 364/708.1; 361/683, 684, 685, 686, 687; 439/638; 174/50; 395/750.02; 708/140

(56) References Cited

U.S. PATENT DOCUMENTS

| 5,475,271 A | | 12/1995 | Shibasaki et al. | |
| 5,563,493 A | * | 10/1996 | Matsuda et al. | 320/124 |
| 5,627,450 A | * | 5/1997 | Ryan et al. | 361/686 |
| 5,729,478 A | | 3/1998 | Ma et al. | |
| 5,768,100 A | | 6/1998 | Barrus et al. | |
| 5,870,615 A | * | 2/1999 | Bar-On et al. | 395/750.02 |
| 6,005,368 A | * | 12/1999 | Frame | 320/113 |

FOREIGN PATENT DOCUMENTS

| EP | 0 759 589 | 2/1997 |
| JP | 63-259708 | 10/1988 |
| JP | 4-205328 | 7/1992 |
| JP | 5-66864 | 3/1993 |
| JP | 5-197446 | 8/1993 |
| JP | 6-102968 | 4/1994 |
| JP | 6-162754 | 6/1994 |
| JP | 6-250762 | 9/1994 |
| JP | 9-311736 | 12/1997 |
| JP | 9-330152 | 12/1997 |
| JP | 10-116133 | 5/1998 |

OTHER PUBLICATIONS

Catalog of Docking Station with i.LINK (DV) Terminal with English language translation of same, 6/98.

* cited by examiner

Primary Examiner—Gregory J. Toatley
(74) Attorney, Agent, or Firm—Staas & Halsey LLP

(57) ABSTRACT

A function expansion device is attached to a portable electronic device such as a notebook-type personal computer so as to provide a function to use various kinds of information storage media. A bay housing is detachably attached to a bottom surface of the notebook-type personal computer. The bay housing has a bay into which a drive unit is inserted. The drive unit can be selected from among a floppy disk drive, a CD-ROM drive, a magneto-optical disk drive, a high-capacity floppy disk drive, a digital video disk and a hard disk drive. Each of the drive units has an identical outer configuration so that each of the drive units can be alternatively attached to the bay housing. Various types of drive units can be connected to the notebook-type personal computer by merely changing the drive unit accommodated in the bay housing.

22 Claims, 20 Drawing Sheets

FUNCTION EXPANSION DEVICE FOR A PORTABLE ELECTRONIC DEVICE

BACKGROUND OF THE INVENTION

1. Field of the Invention

The present invention generally relates to a function expansion device and, more particularly, to a function expansion device for the electronic device installed in the bottom of a portable electronic device.

The function expansion device (so-called function station) for a portable electronic device (for example, a notebook-type personal computer) which expands the function of the portable electronic device is provided as an attachment of the electronic device which is a portable device. The function expansion device for such a portable electronic device is provided with an information storage medium therein, and has a function which not provided in the portable electronic device. The function expansion device for a portable electronic device is used for expanding the function of a portable electronic device. The function expansion device also serves to reduce a thickness of the portable electronic device by limiting a function of the portable electronic device. Accordingly, the function expansion device becomes necessary for a portable electronic device.

In recent years, besides a conventional floppy disk and CD-ROM, a magneto-optical disk (MO), high-density recording floppy disk (LS-120) and a digital video disk (DVD), etc. are developed, and the information storage medium is diversified. Accordingly, it is preferable that the function expansion device for a portable electronic device be constructed to correspond to the diversification of the information storage medium in recent years. Moreover, it is preferable that the function expansion device for a portable electronic device be as small as possible so that it can be carried easily. Further, it is preferable that the function expansion device for a portable electronic device has good extendibility of its function.

2. Description of the Related Art

FIG. 1 shows a conventional function expansion device 10 for a notebook-type personal computer 20 as a portable electronic device. The function expansion device 10 is attached to a bottom side of the notebook-type personal computer 20. A connector 11 of the function expansion device 10 is connected to a connector 21 of the notebook-type personal computer 20. The function expansion device 10 has a floppy disk drive 12 and a CD-ROM drive 13. Insertion openings for the floppy disk and the CD-ROM are provided on a front side of the function expansion device 10.

In order to expand the function of the notebook-type personal computer 20, the function expansion device 10 is attached to the notebook-type personal computer 20, and a floppy disk cartridge 30 or a CD-ROM 31 is loaded to the respective floppy disk drive 12 or the CD-ROM drive 13.

Since the conventional function expansion device 10 has only the floppy disk drive 12 and the CD-ROM drive 13, an information storage medium which can be used with the function expansion device 10 is limited to a floppy disk and a CD-ROM. Accordingly, the function expansion device 10 cannot use other information storage media available on the market, such as a magneto-optical disk (MO), a high capacity floppy disk (LS-120) or a digital video disk (DVD). That is, the function expansion device 10 is limited in its extendibility, and is inconvenient in use.

Additionally, the conventional function expansion device 10 is not made to be a portable unit, and, the size of the function expansion device 10 is almost the same as that of the notebook-type personal computer 20. Thus, it is inconvenient for carrying the notebook-type personal computer with the function expansion device 10 attached thereto.

SUMMARY OF THE INVENTION

It is a general object of the present invention to provide an improved and useful function expansion device for a portable electronic device in which above-mentioned problems are eliminated.

A more specific object of the present invention is to provide a function expansion device adapted to be attached to a portable electronic device which function expansion device provides a function to use various kinds of information storage media.

Another object of the present invention is to provide a function expansion device having a size smaller than that of a conventional function expansion device.

In order to achieve the above-mentioned objects, there is provided according to one aspect of the present invention a function expansion device for expanding a function of a portable electronic device by being detachably attached to the portable electronic device, the function expansion device comprising:

a unit accommodating part which removably accommodates a functional unit, and wherein the functional unit provides a function to be added to said portable device.

According to the above-mentioned invention, the functional unit can be easily removed from the function expansion device and replaced by a different functional unit which provides a different function to the portable electronic device. That is, one of a plurality of functional units can be selectively accommodated in the unit accommodating part so that different functions can be provided to the portable electronic device. Thus, various functions can be provided to the electronic device with a simple structure and operation.

In one embodiment of the present invention, the function expansion device includes a bay housing detachably attached to a bottom surface of a notebook-type personal computer as the portable electronic device. The bay housing includes a bay into which a drive unit is inserted. The drive unit can be selected from among a hard disk drive, a floppy disk drive, a CD-ROM drive, a magneto-optical disk drive, a high-capacity floppy disk drive and a digital video disk drive. Each of the drive units has an identical outer configuration so that each of the drive units can be alternatively attached to the bay housing. Accordingly, even if the bay housing has a single bay, various drive units can be connected to the notebook-type personal computer by merely changing the drive units accommodated in the bay housing.

The function expansion device according to the present invention may further comprise a battery accommodating part which accommodates a battery pack for providing an electric power to at least one of the portable electronic device and the functional unit accommodated in the unit accommodating part.

The function expansion device according to the above-mentioned invention may further comprise a charging circuit charging the battery pack accommodated in the battery accommodating part.

Accordingly, the function expansion device can be used as a charger for charging the battery pack which provides an electric power to the portable electronic device.

Additionally, in the function expansion device according to the present invention, the battery accommodating part may have a configuration the same as that of a battery accommodating part of the portable electronic device so that a battery pack used for the portable electronic device is used as the battery pack to be accommodated in the battery accommodating part of the function expansion device.

Accordingly, the battery pack accommodated in the function expansion device can be commonly to the battery pack provided in the portable electronic device. Thus, there is no need to prepare a battery pack exclusive for the function expansion device.

Additionally, in the function expansion device according to the present invention, the functional unit may be an adapter which converts a commercially available voltage into a voltage used by the portable electronic device.

Accordingly, the function expansion device can be used as a power supply adapter for supplying a DC voltage to the portable electronic device by converting a commercially available AC voltage into the DC voltage suitable for the potable electronic device.

In the above-mentioned invention, the adapter may include a charging circuit for charging a battery pack provided in the function expansion device.

Accordingly, the function expansion device can be used as a charger for the battery pack.

Further, the function expansion device according to the present invention may further comprise a cooling unit for cooling an interior of the function expansion device.

Accordingly, a drive unit which generates a considerable amount of heat can be attached to the function expansion device.

Additionally, the function expansion device according to the present invention may further comprise a member which adjusts an angle of the portable electronic device when the function expansion device is mounted to the portable electronic device, the angle being formed between a bottom surface of the function expansion device and a surface on which the portable electronic device is placed.

Accordingly, the portable electronic device to which the function expansion device according to the present invention is mounted can be operated at an angle according to user's preference.

Additionally, in the function expansion device according to the present, an outer configuration of the function expansion device is determined so that an operation related to the portable electronic device is facilitated by the outer configuration of the function expansion device.

Additionally, there is provided according to another aspect of the present invention an electronic device system comprising:
  an electronic device;
  a plurality of functional units each of which provides a function to be added to the electronic device; and
  a function expansion device detachably attached to the electronic device, the function expansion device including a unit accommodating part which accommodates one of the functional units.

Additionally, there is provided according to another aspect of the present invention a functional unit providing a function to be added to an electronic device via an attachment which is detachably mounted to the electronic device, the functional unit being detachably attached to the attachment.

The functional unit according to the present invention may further comprise a converter which converts a commercially available voltage into a voltage suitable for driving the electronic device.

Additionally, the functional unit may further comprise a charging circuit for charging a battery pack provided in the attachment so that the battery pack is charged by using the commercially available voltage.

Other objects, features and advantages of the present invention will become more apparent from the following detailed description when read in conjunction with the accompanying drawings.

BRIEF DESCRIPTION OF THE DRAIWINGS

DETAILED DESCRIPTION OF THE PREFERRED EMBODIMENTS

Figure 1:
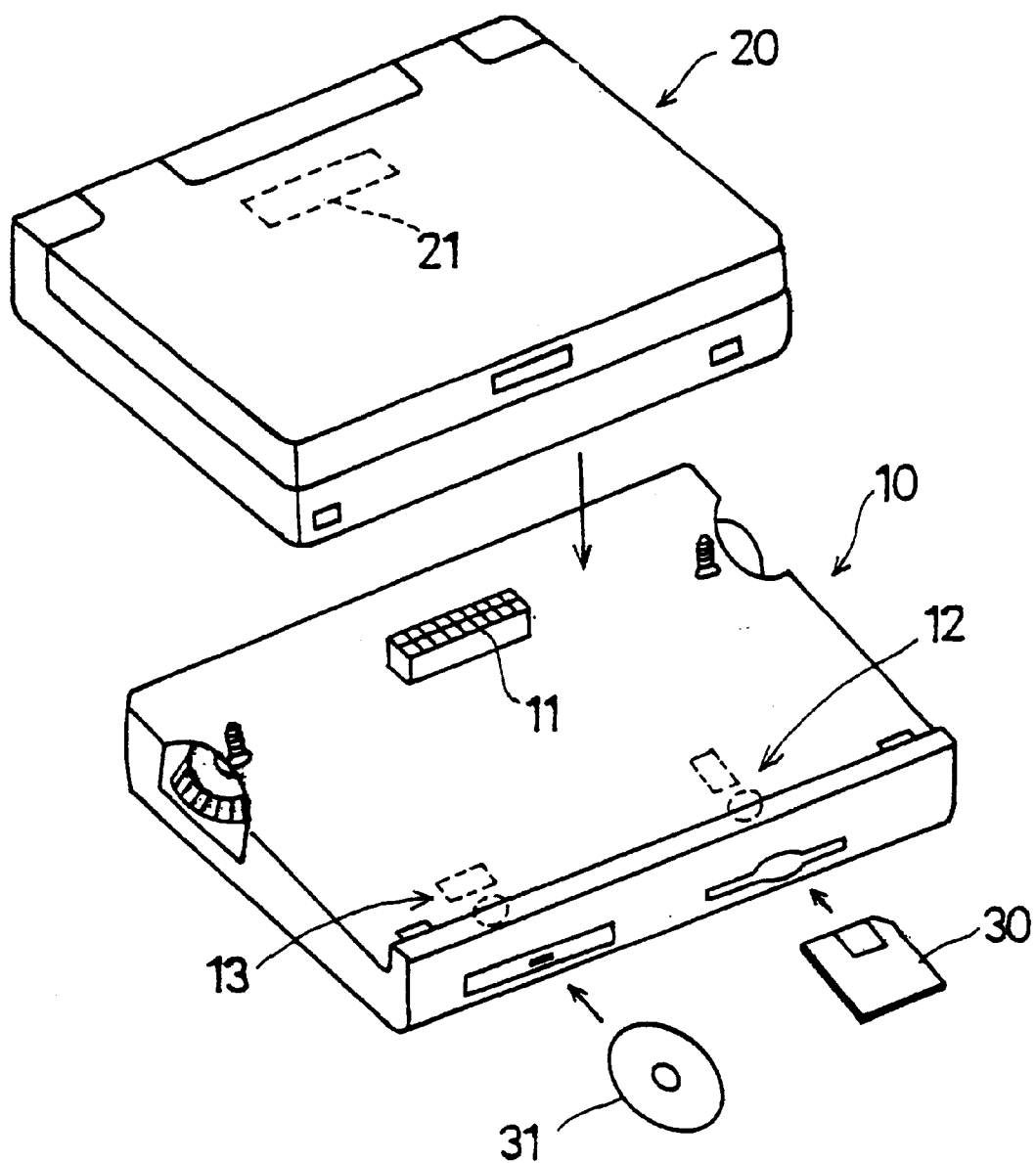
FIG. 1 is a perspective view of a conventional function expansion device adapted to be attached to a notebook-type personal computer.
Figure 2:
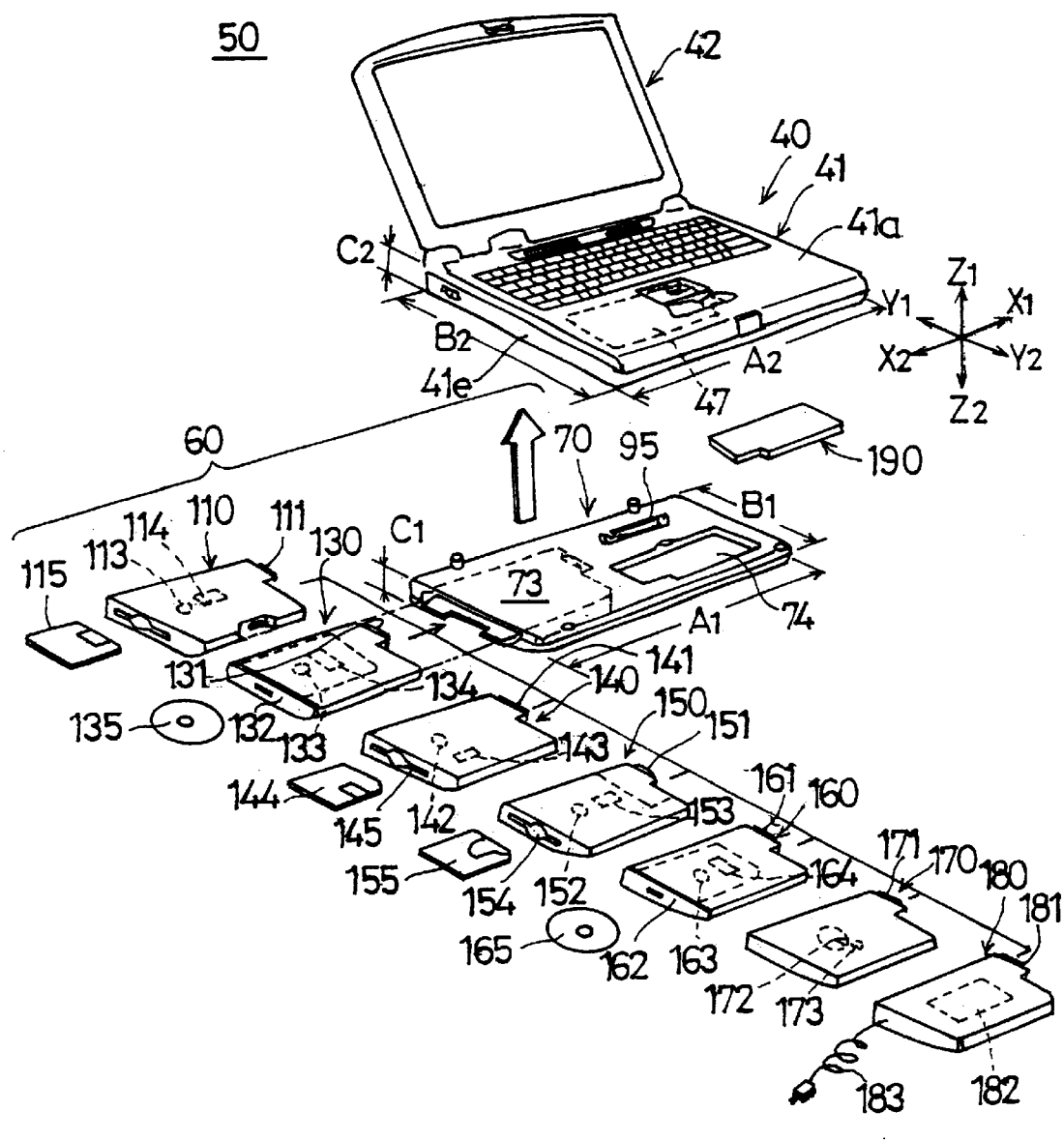
FIG. 2 is a perspective view of a notebook-type personal computer and a function expansion device according to a first embodiment of the present invention.

A description will now be given, with reference to FIG. 2, of a function expansion device according to a first embodiment of the present invention. FIG. 2 is a perspective view of a notebook-type personal computer system 50 including a notebook-type personal computer 40 and the function expansion device 60 according to the first embodiment of the present invention. In FIG. 2, directions indicated by arrows X1 and X2 correspond to a direction of a width of the notebook-type personal computer 40; directions indicated by arrows Y1 and Y2 correspond to a direction of a depth of the notebook-type personal computer 40; directions indicated by arrows Z1 and Z2 correspond to a direction of a height or thickness of the notebook-type personal computer 40. Hereinafter, the directions indicated by arrows X1, X2, Y1, Y2, Z1 and Z2 are referred to as directions X1, X2, Y1, Y2, Z1 and Z2, respectively.

The function expansion device 60 comprises a bay housing 70, a floppy disk drive 110, a CD-ROM drive 130, a magneto-optical disk drive 140, a high capacity floppy disc drive 150, a digital video disk drive 160, a hard disk drive 170, an AC/DC adapter 180 and a battery pack 190.

A battery pack 190 is attached to the housing bay 70. Additionally, the housing bay 70 is provided with a portion to which one of the floppy disk drive 110, the CD-ROM drive 130, the magneto-optical disk drive 140, the high-capacity floppy disk drive 150, the digital video disk device 160, a hard disk drive 170 and the AC/DC adapter 180 is attached. Thus, there are eight functions which can be provided by selecting one of the above-mentioned drives or units. Thus, extendibility of the function expansion device 60 can provide much wider extendibility than the conventional function expansion device. The function expansion device 60 is attached to the bottom side of the notebook-type personal computer-40. Additionally, the function expansion device 60 can serves as a charger of the battery pack 190 and also serves as a supporting legs of the notebook-type personal computer 40.

Figure 3:
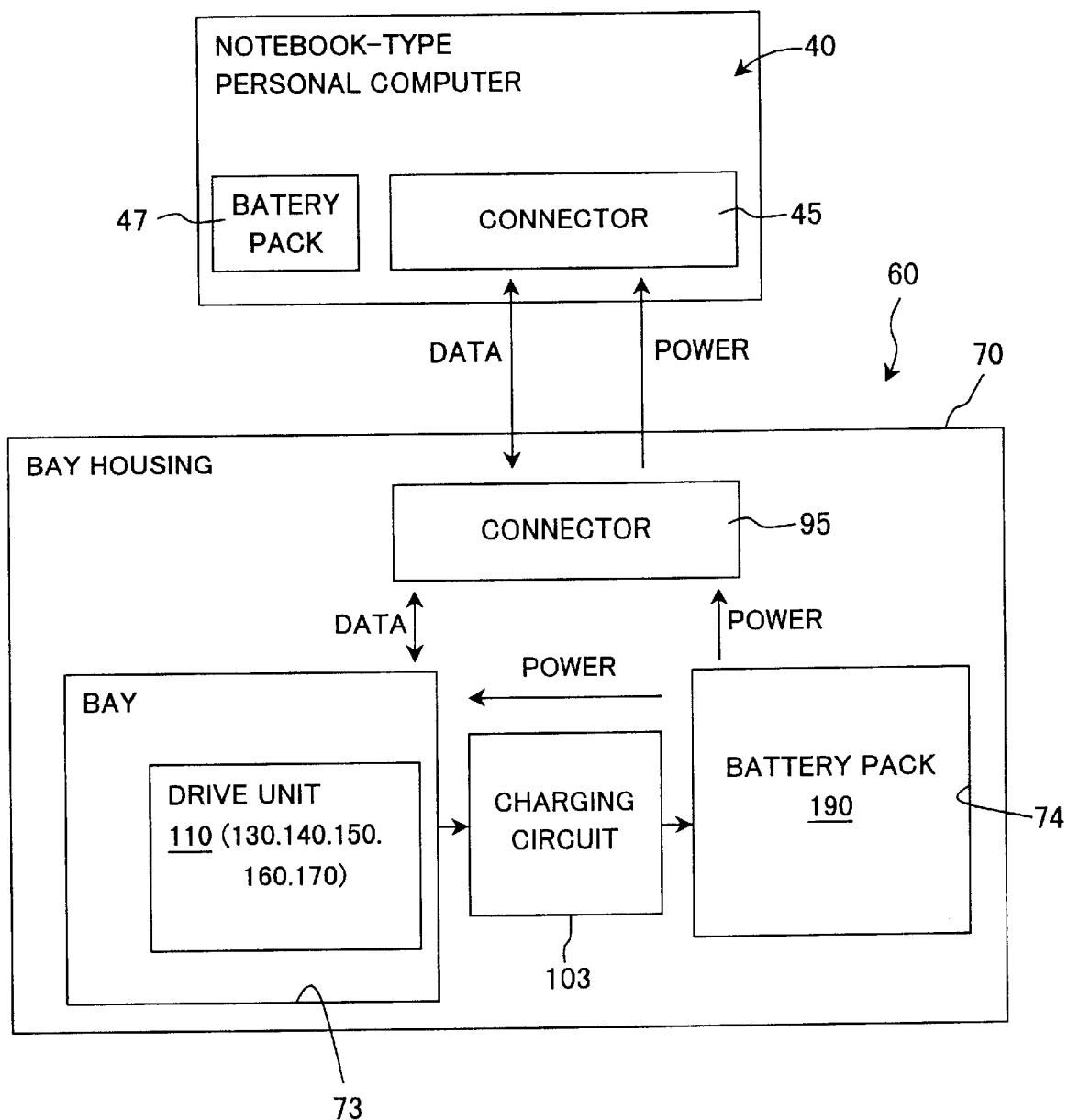
FIG. 3 is an illustration for explaining an electrical connection between the function expansion device and the notebook-type personal computer shown in FIG. 2.

When the function expansion device 60 for a notebook-type personal computer is attached to the notebook-type personal computer 40, the function expansion device 60 and the notebook-type personal computer 40 are electrically connected to each other as shown in FIG. 3 so that the function of the notebook-type personal computer 40 is expanded.

A description will now be given of each unit constituting the function expanding device 60.

(1) The Bay Housing 70:

The bay housing 70 has approximately a rectangular plate shape. A width A2 of the housing bay 70 is substantially equal to a width A1 of the notebook-type personal computer 40. A depth B1 of the housing bay 70 is substantially one half of a depth B2 of the notebook-type personal computer 40. A thickness C1 of the bay housing 70 is substantially equal to a thickness of the notebook-type personal computer 40. Accordingly, the overall size of the bay housing 70 is approximately on half of the overall size of the notebook-type personal computer 40, and is easily carried. The bay housing 70 is smaller than the conventional function expansion device since the bay housing has a single bay into which the floppy disk drive 110 is inserted. It should be noted that the directions X1 and X2 correspond to the longitudinal direction of function expansion device 60.

As shown in FIGS. 4, 5, 6 and 7, the bay housing 70 has a construction in which a lower-half body 71 and an upper-half body 72 are assembled. A bay 73 which is a space for accommodating a drive unit is formed in a half part on the side of the direction X2. A battery pack accommodating part 74 and an expansion connector 75 are provided in a half part on the side of the direction X1. Additionally, the bay housing 70 has fixed claws 78 and 79 along a Y1 side of a top surface the 70a on the respective sides of the directions X1 and X2. Further, the bay housing 70 has movable claws 78 and 79 along a Y2 side of a top surface the 70a on the respective sides of the directions X1 and X2.

The bay 73 is a flat space formed between the lower-half body 71 and the upper-half body 72, and has a contour corresponding to an outer configuration of the floppy disk drive 110. The bay 73 has an opening 73a through which the floppy disk drive 110 is inserted. A notch window 82 is formed on the lower-half body 71 on the side of the opening 73a. The notch window 82 is provided so as to facilitate an operation for removing the floppy disk drive 110 from the by 73. A connector 83 is provided in the inner part of the bay 73.

Figure 5:
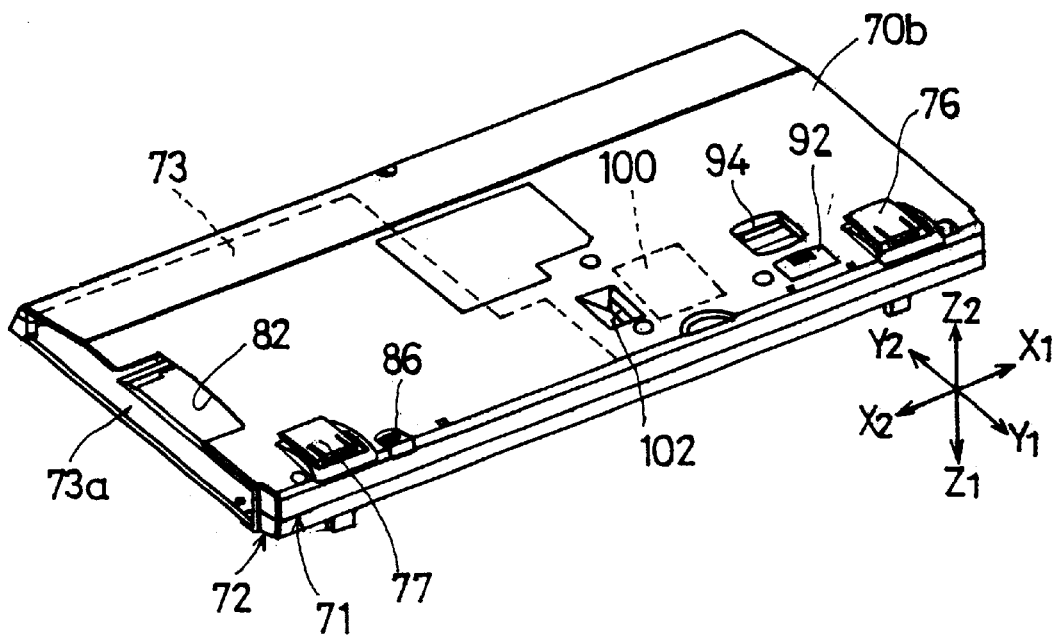
FIG. 5 is a perspective view of the bay housing shown in FIG. 2, viewed from a bottom side.
Figure 6:
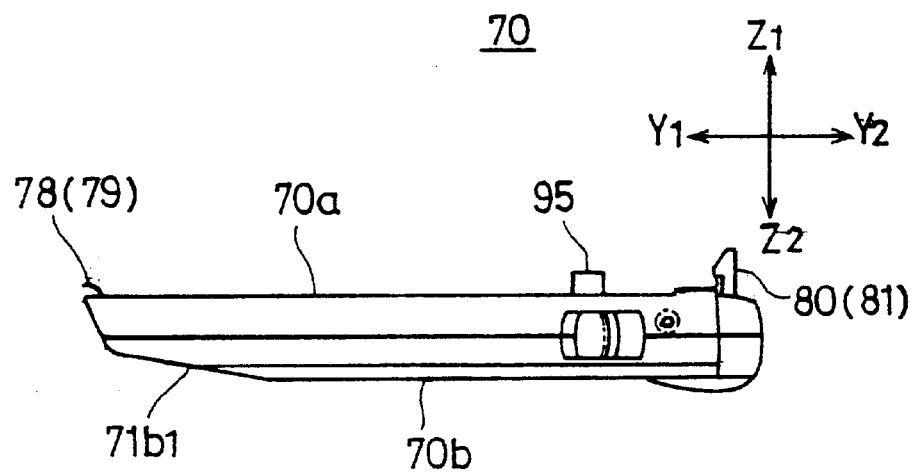
FIG. 6 is a side view of the bay housing shown in FIG. 2.
Figure 7:
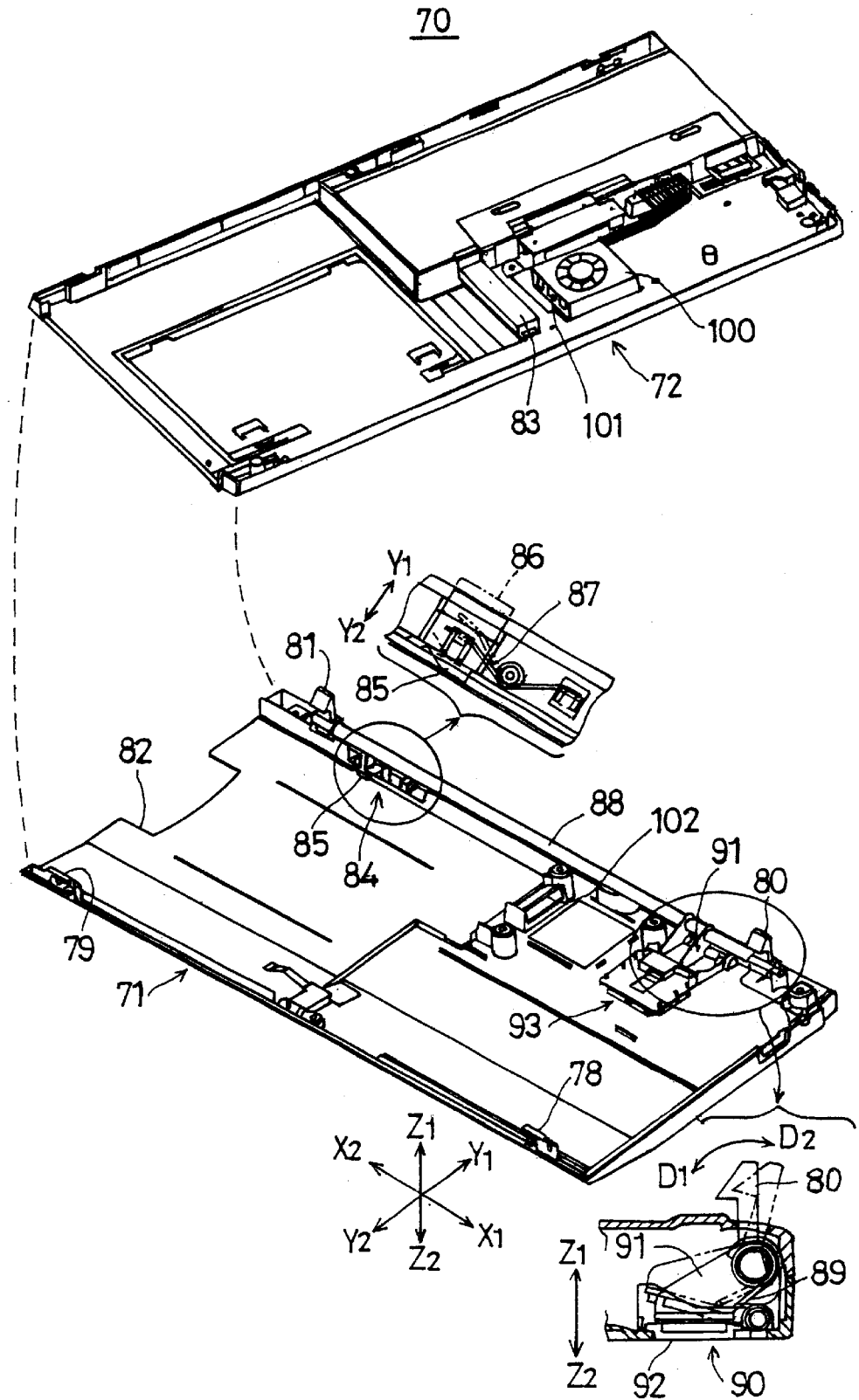
FIG. 7 is an exploded perspective view of the bay housing shown in FIG. 2.

A locking mechanism 84 is provided in a part along the Y2 side of the bay 73 as shown in FIG. 6. The locking mechanism 84 includes a locking claw 85 and an unlocking knob 86 that are integrally formed with each other to form a locking member. The locking member is mounted on the lower-half body 71. The locking member is urged by a spring 87 in the direction Y2 so that the locking claw 85 protrudes into the bay 73. The locking claw can be moved rearward by operating the unlocking knob 86 to slide in the direction Y1 so that a unit such as the floppy disk drive 110 accommodated in the bay 73 is unlocked and is movable in the direction of removal. As shown in FIG. 7, the movable claws 80 and 81 are fixed to opposite ends of a rod 88 that is supported by the lower-half body 71 at the opposite ends. The movable claws 80 and 81 are urged by a spring 89 in a direction indicated by an arrow D1. An arm 91 extends from the rod 88 in a direction perpendicular to the longitudinal direction of the rod 88. An unlocking knob 92 is provided on an end of the arm 91 so that the unlocking knob 92 is exposed through an opening formed on a bottom surface of 70b of the bay housing 70. The movable claws 80 and 81 and the rod 88 are rotated in a direction indicated by an arrow D2 against the spring 89 against an urging force of the spring 89 so that the bay housing 70 is unlocked with respect to the notebook-type personal computer 40. A locking mechanism 93 is provided in relation to the unlocking knob 92. The unlocking knob 92 is prevented from being operated, that is, the unlocking knob is locked by sliding an operational knob 94 (shown in FIG. 5) exposed from the bottom surface 70b of the bay housing 70 in the direction Y2. The locking knob 92 is unlocked, that is, the locking knob can be in an operable state by sliding the operational knob 94 in the direction Y1.

Figure 4:
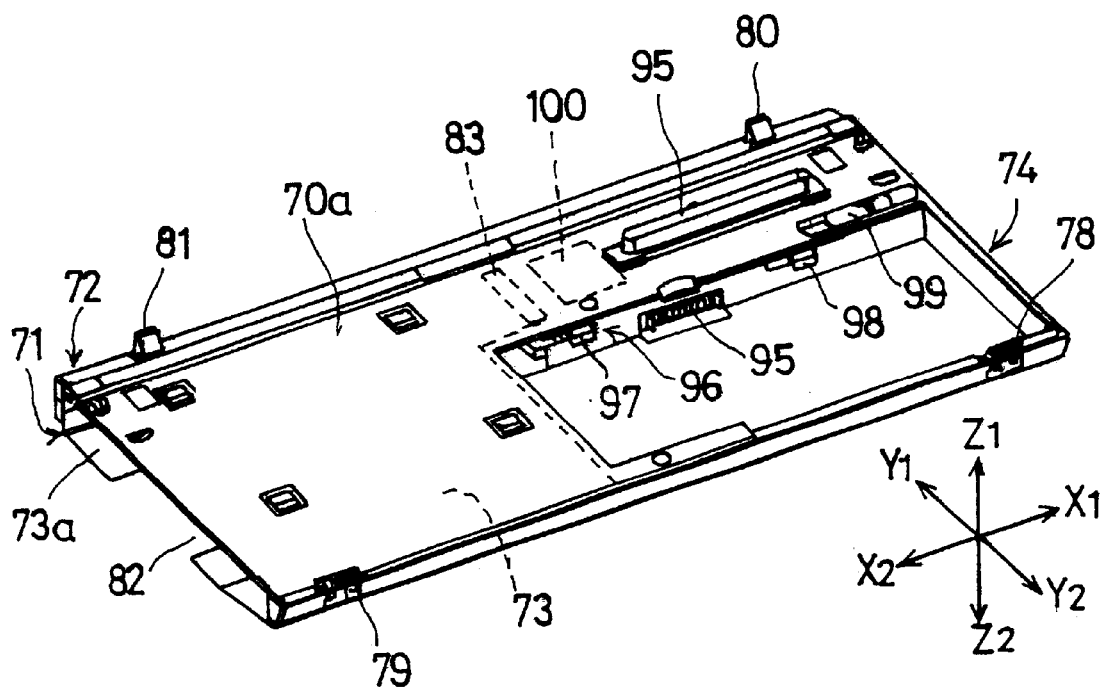
FIG. 4 is a perspective view of a bay housing shown in FIG. 2.
Figure 8A:
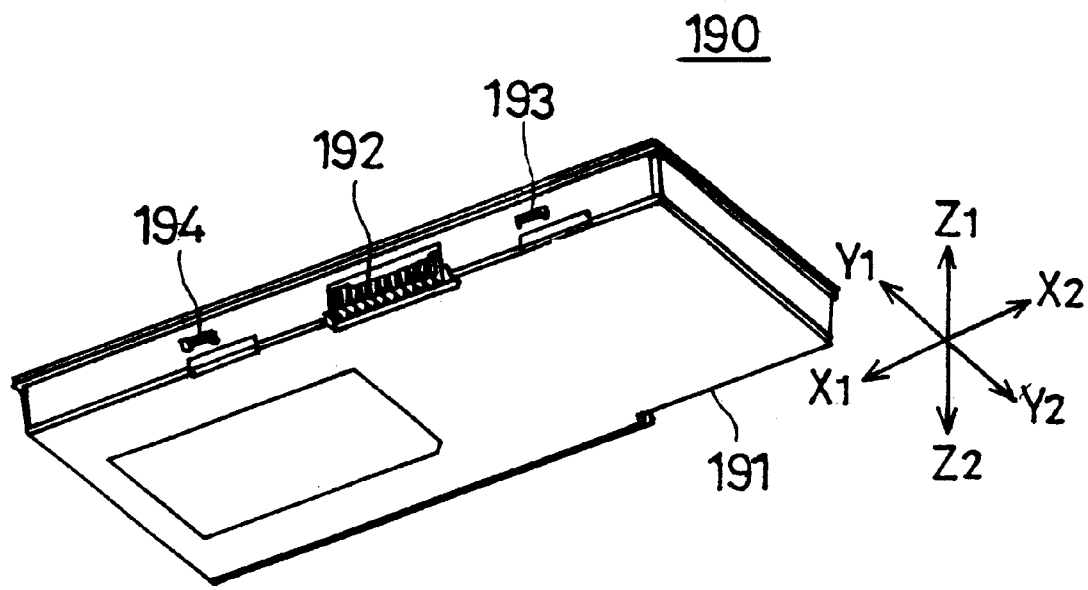
FIG. 8A is a perspective view of a battery pack shown in FIG. 2, viewed from a bottom side.
Figure 8B:
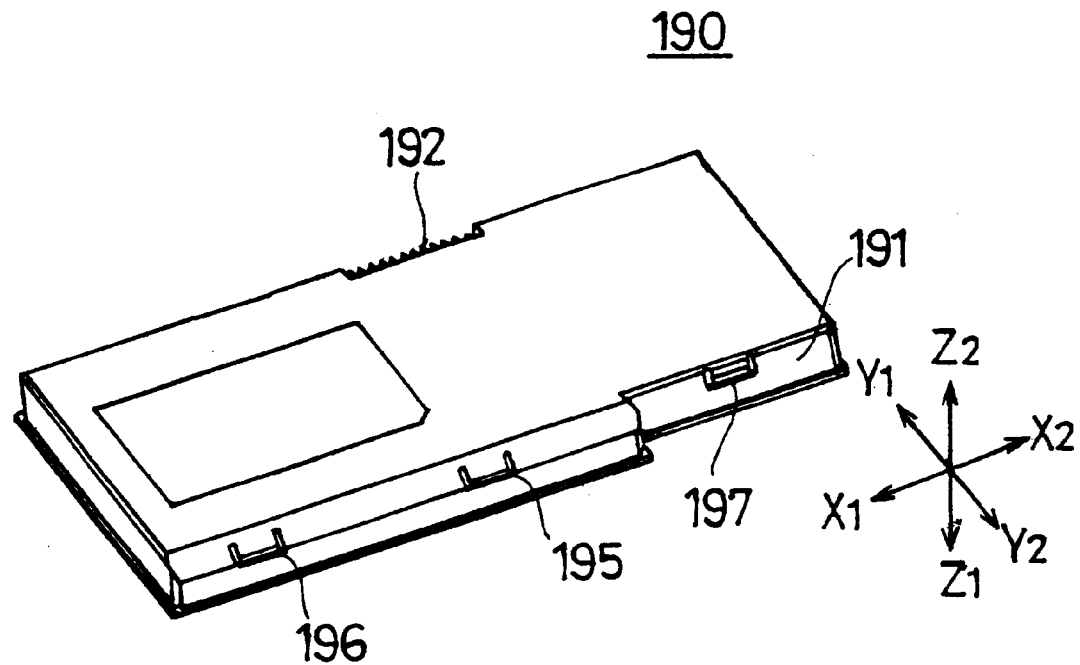
FIG. 8B is a perspective view of the battery pack shown in FIG. 2, viewed from a top side.

The battery pack accommodating part 74 shown in FIG. 4 has a configuration corresponding to the configuration of the battery pack 190 shown in FIGS. 8A and 8B. The battery pack accommodating part 74 is formed in the upper-half body 72. A terminal 95 and a locking mechanism 96 is provided in relation to the battery pack accommodating part 74. The locking mechanism 96 includes locking claws 97 and 98 and operational knob 99. The battery pack 190 has an outer configuration the same as that of the battery pack 47 of the notebook-type personal computer 40.

Additionally, a cooling fan 100 is mounted on a back surface of the upper-half body 72. In relation to the cooling fan 100, a ventilation opening 102 is formed on the lower-half body 71 so that air outlet from an opening 101 of the cooling fan 100 is discharged from the bay housing 70 in a diagonal direction.

Tilting legs 76 and 77 are pivotably mounted on the lower-half body 71 as shown in FIG. 5. The tilting legs 76 and 77 are normally folded to sit on the bottom surface 70b of the housing bay 70. Additionally, a charging circuit 103 for charging the battery pack 190 attached to the bay housing 190 is provided in the bay housing 70.

Additionally, the bay housing 70 has a slanting surface 70b1 slanting in the direction Z1 in a part of the bottom surface 70b on near the Y1 side as shown in FIG. 6 so that the housing bay can serve as a base of the notebook-type personal computer 40. The housing bay 70 is attached on the bottom surface of the notebook-type personal computer 40 in a position near the rear side of the notebook-type personal computer 40.

(2) The Floppy Disk Drive 110:

As shown in FIG. 2, each of the drive units 110, 130, 140, 150, 160 and 170 and the AC/DC adapter 180 has substantially the same outer configuration that is a flat shape so that each of the drive units can be inserted into the bay 73 of the bay housing 70. The drive units 110, 130, 140, 150, 160 and 170 and the AC/DC adapter 180 have connectors 111, 131, 141, 151, 161, 171 and 181, respectively, at the same position on their end on the side of the direction X1.

Figure 9A:
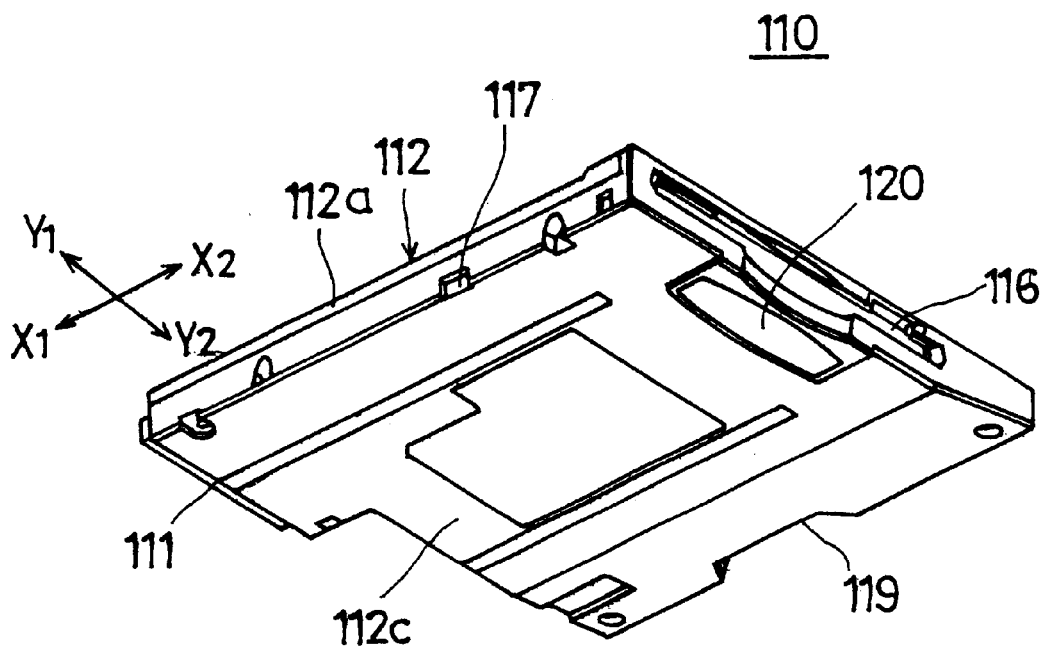
FIG. 9A is a perspective view of a floppy disk drive shown in FIG. 2, viewed from a bottom side.
Figure 9B:
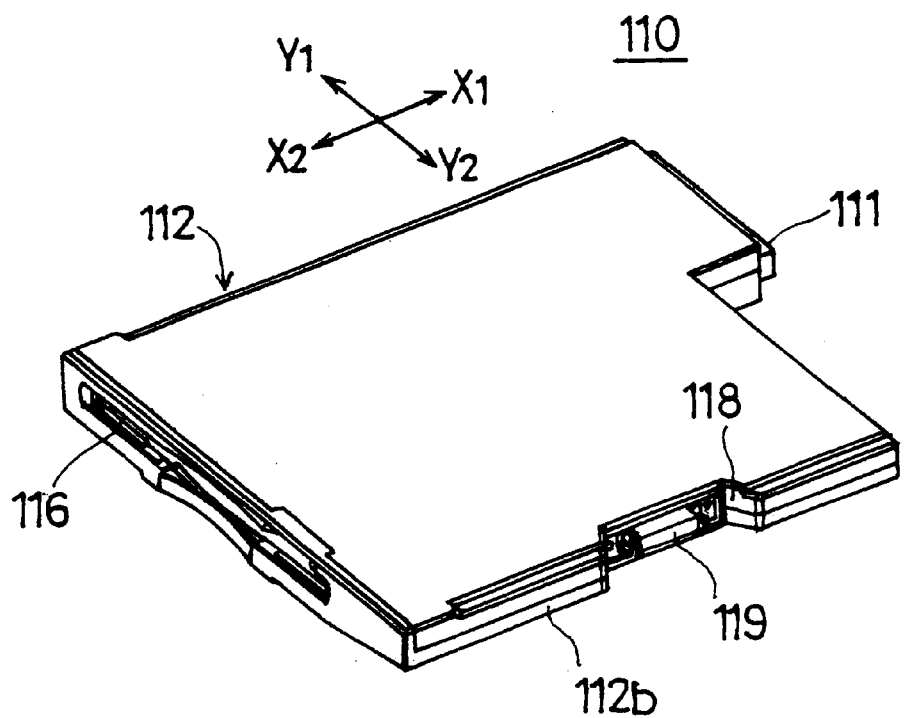
FIG. 9B is a perspective view of a floppy disk drive of the floppy disk drive, viewed from a top side.
Figure 12:
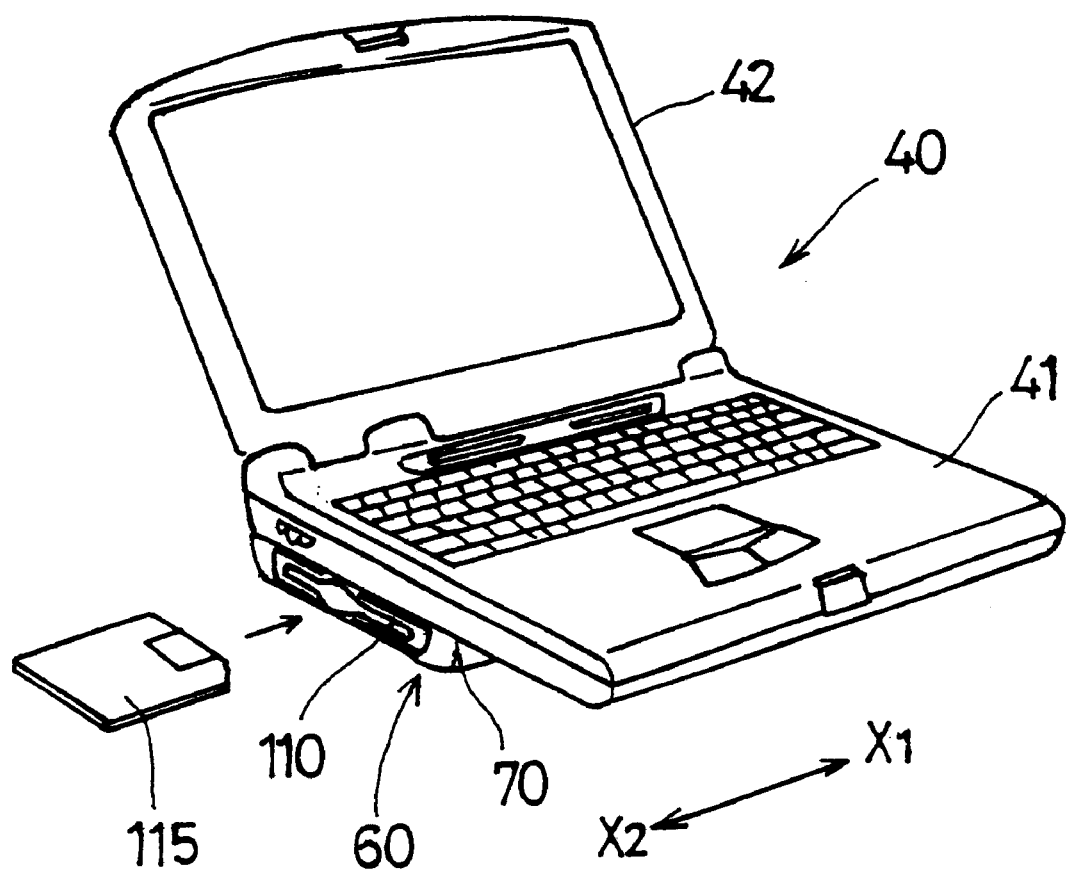
FIG. 12 is a perspective view of the notebook-type personal computer used in an expansion mode 1.

As shown in FIG. 2 and FIGS. 9A and 9B, the floppy disk drive 110 has a flat shape corresponding to bay 73 so that the floppy disc drive 110 can be inserted into the bay 73. Additionally, the floppy disk drive 110 has the connector 111 on the end in the direction X1 (the direction of insertion). A turntable 113 (refer to FIG. 2) and a magnetic head 114 (refer to FIG. 2) are provided inside a main body 112 of the floppy disk drive 110. A floppy disk insertion opening 116 is formed on the main body 112 on an end in the direction X2. The main body 112 has a depression 117 for locking on a side surface 112a in the direction Y1 and a depression 118 on a side surface 120b in the direction Y2. The depression 118 is provided with a connector 119. Additionally, the main body 112 has a finger engaging part 120 which is exposed through the notch window 82 in a state in which the floppy disk drive 110 is positioned inside the bay housing 70. The connector 119 can be electrically connected to the notebook-type personal computer 40 via a connector 41g (shown in FIG. 10) provided on a rear surface of the notebook-type personal computer 40 and a cable. As also shown in FIG. 12, a floppy disk cartridge 115 is inserted into the floppy drive unit 110 through the insertion opening 116 in the direction X1.

Figure 13:
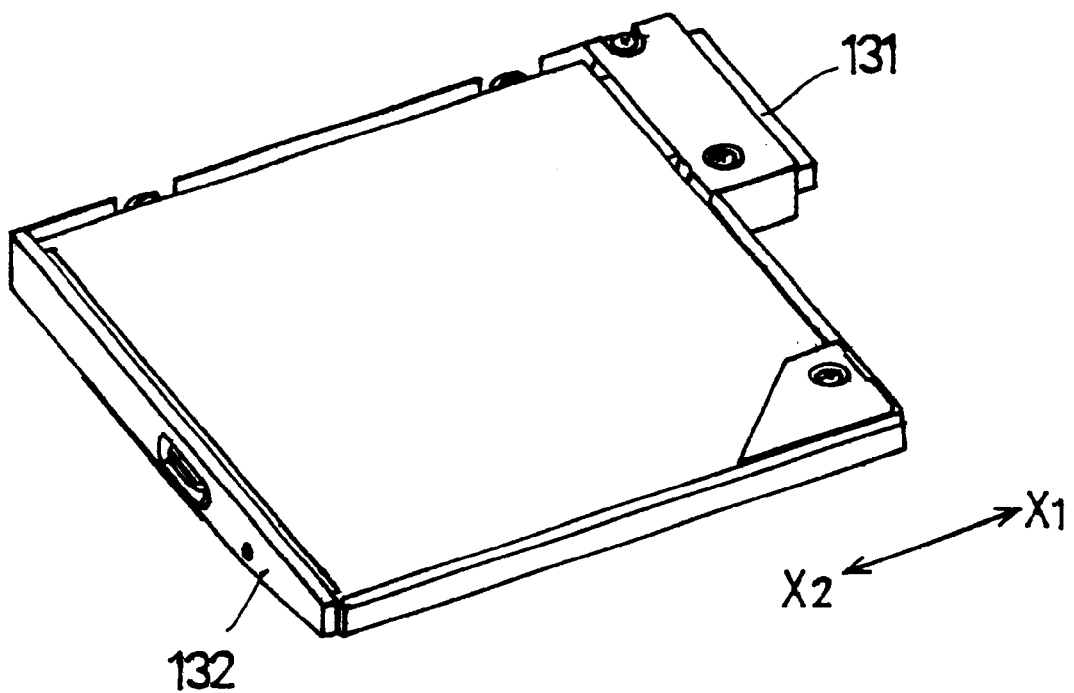
FIG. 13 is a perspective view of a CD-ROM drive shown in FIG. 2.
Figure 14:
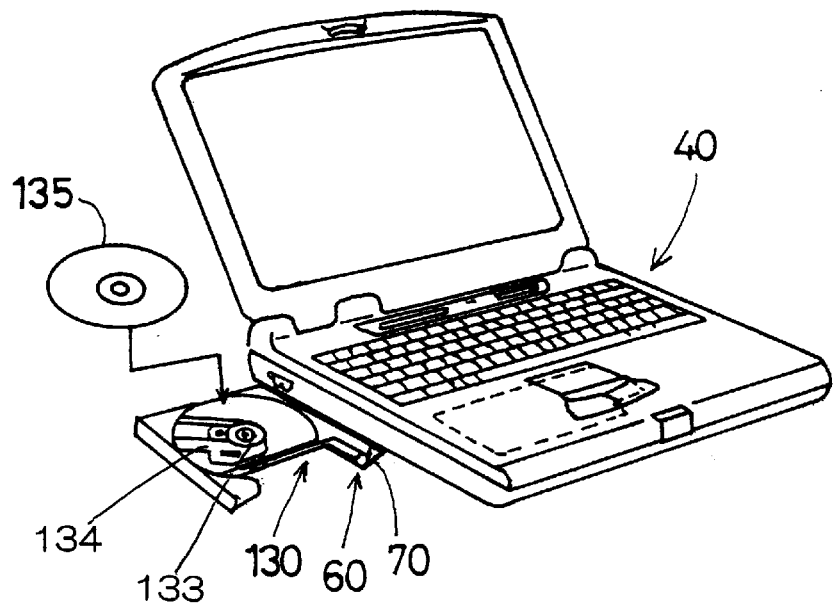
FIG. 14 is a perspective view of the notebook-type personal computer used in an expansion mode 2.

(3) The CD-ROM Drive 130:

As shown in FIG. 2, FIG. 13 and FIG. 14, the CD-ROM drive 130 is different from the floppy disk drive 110 in that the CD-ROM drive 130 is not provided with the depression 118 and the connector 119. Instead, the CD-ROM drive 130 has a connector 131 positioned on an end in the direction X1 (the direction of insertion), and also has a drawer mechanism 132. The drawer mechanism 132 includes a turntable 133 and an optical head 134. A CD-ROM 135 is placed on the turntable 133.

Figure 15:
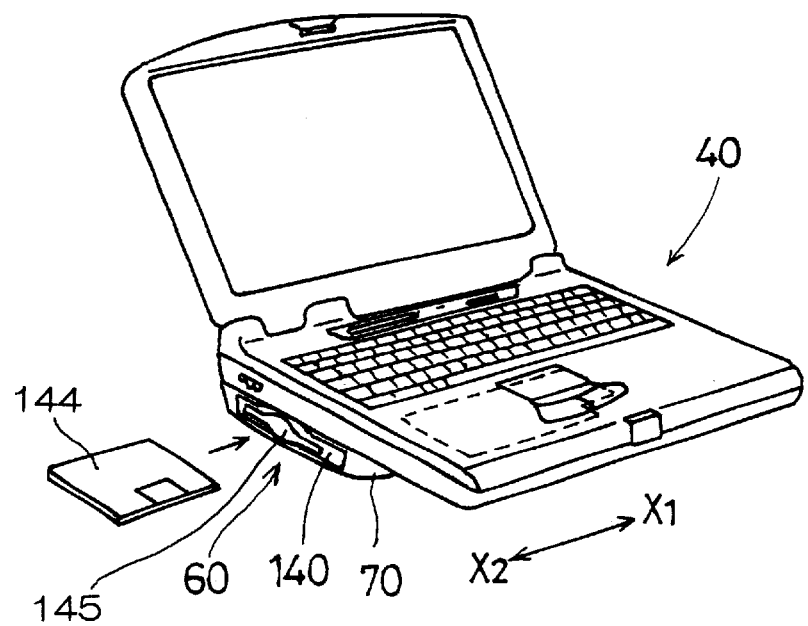
FIG. 15 is a perspective view of the notebook-type personal computer used in an expansion mode 3.

(4) The Magneto-optical Disk Drive 140:

As shown in FIG. 2 and FIG. 15, the magneto-optical disk drive 140 has the same outer configuration as the CD-ROM drive 130, and has the connector 141 on an end in the direction X1 (the direction of insertion). A turntable 142 and an optical head unit 143 are provided inside the magneto-optical disk drive 140. A magneto-optical disk cartridge 144 is inserted into the magneto-optical disk drive 140 through an insertion opening 145 in the direction X1 as shown in FIG. 15.

Figure 16:
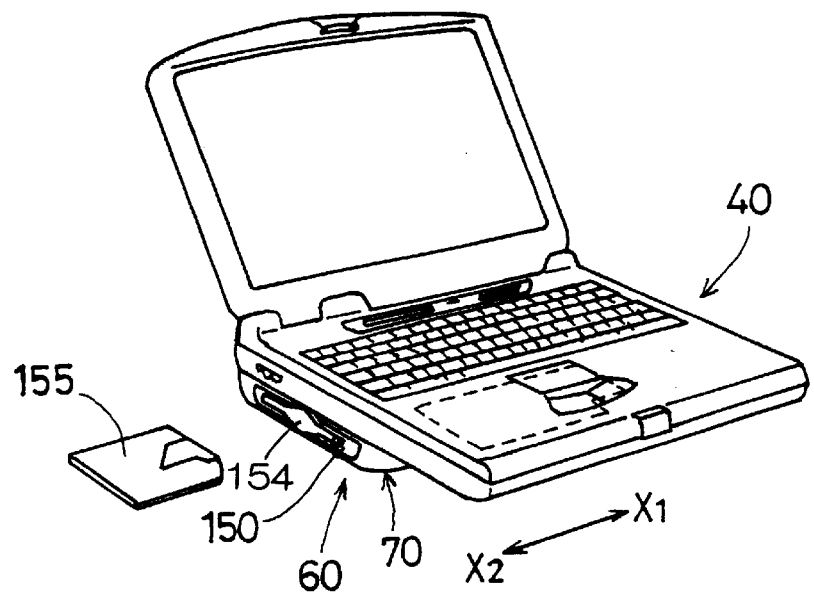
FIG. 16 is a perspective view of the notebook-type personal computer used in an expansion mode 4.

(5) The High-capacity Floppy Disk Drive 150:

As shown in FIG. 2 and FIG. 16, the high-capacity floppy disk drive 150 has the same outer configuration as the CD-ROM drive 130, and has the connector 151 on an end in the direction X1 (the direction of insertion). A turntable 152 and a magnetic head unit 153 are provided inside the high-capacity floppy disk drive 150. A high-capacity floppy disk cartridge 155 is inserted into the high-capacity floppy disk drive 150 through an insertion opening 154 in the direction X1 as shown in FIG. 16.

Figure 17:
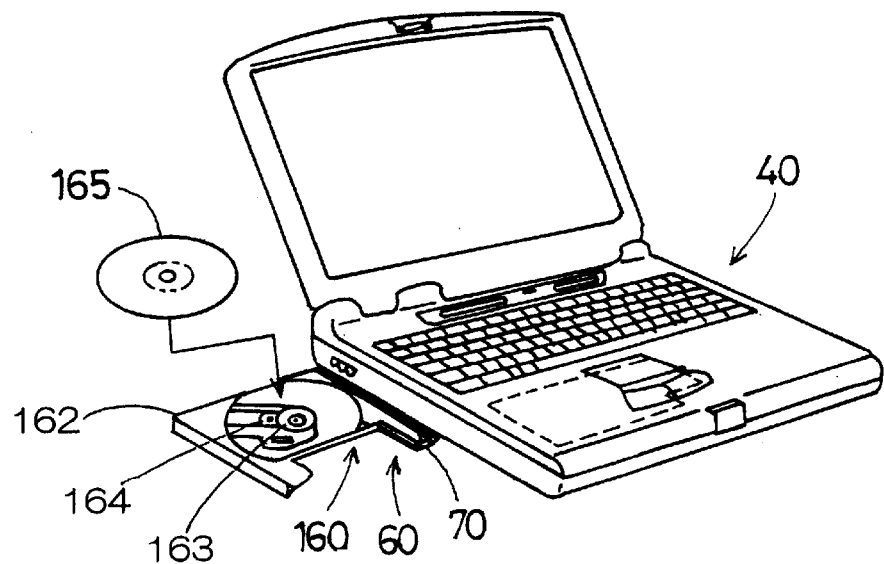
FIG. 17 is a perspective view of the notebook-type personal computer used in an expansion mode 5.

(6) The Digital Video Disk Drive 160:

As shown in FIG. 2 and FIG. 17, the digital video disk drive 160 has the same outer configuration as the CD-ROM drive 130, and has the connector 161 on an end in the direction X1 (the direction of insertion). The digital disk drive 160 has a drawer 162 which can be drawn in the direction X2 as shown in FIG. 17. A turntable 163 and an optical head unit 1164 are provided on the drawer 162. A digital vide disk 165 is placed on the turntable 163.

Figure 18:
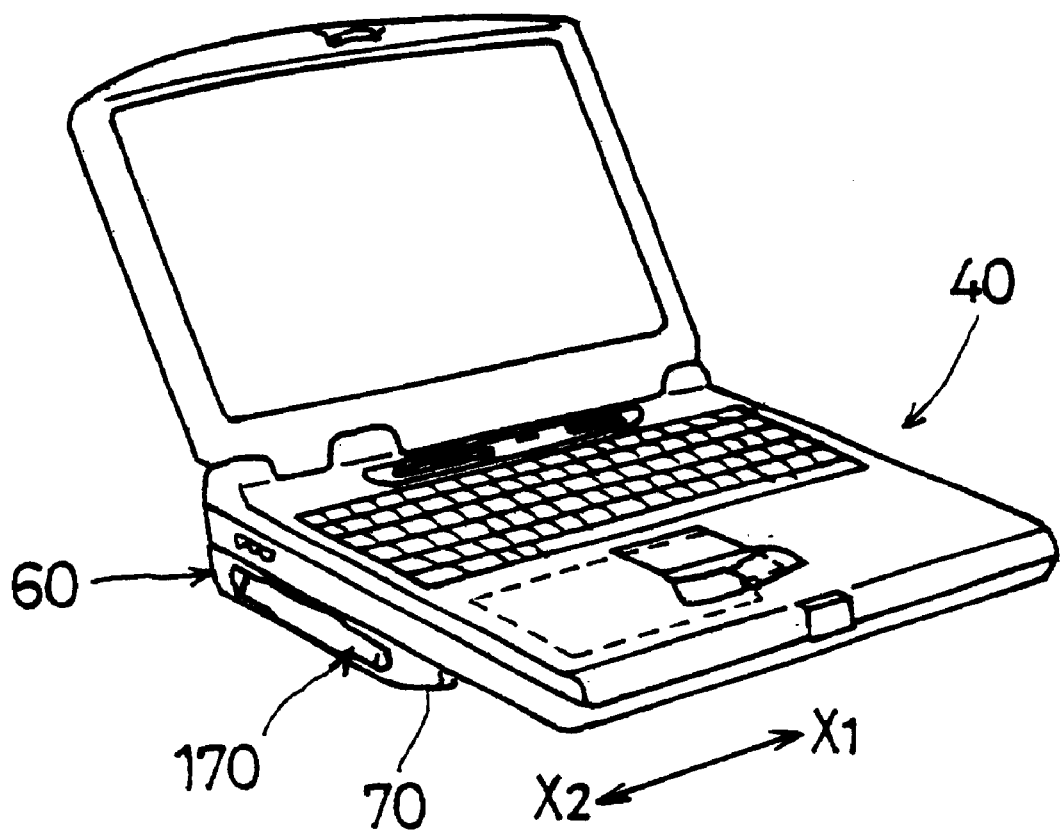
FIG. 18 is a perspective view of the notebook-type personal computer used in an expansion mode 6.

(7) The Hard Disk Drive 170:

As shown in FIG. 2 and FIG. 18, the hard disk drive 170 has the same outer configuration as the CD-ROM drive 130, and has the connector 171 on an end in the direction X1 (the direction of insertion). A hard disk 171 and a magnetic head unit 173 are provided inside the hard disk drive 170.

(8) The AC/DC Adapter 180:

As shown in FIG. 2, the AC/DC adapter 180 has the same outer configuration as the CD-ROM drive 130, and has the connector 181 on an end in the direction X1 (the direction of insertion). An AC/DC converter 182 is provided inside the AC/DC adapter 180. A power supply cord 183 extends from an end in the direction X2. It should be noted that a bay having the same structure as the bay 73 of the bay housing 70 may be provided on the notebook-type personal computer 40 so as to use the AC/DC adapter 180 as a power supply adapter for the notebook-type personal computer 40 by inserting the AC/DC adapter 180 into the bay provided on the notebook-type personal computer 40.

(9) The Battery Pack 190:

As shown in FIG. 2 and FIGS. 8A and 8B, the battery pack 190 has substantially a rectangular plate shape. The battery pack 190 has a notched part 191 so that an orientation of the battery pack 190 an be easily recognized. A terminal 192 and claw arts 193 and 194 are provided on a side surface in the direction Y1. Additionally, claw parts 195, 196 and 197 are provided in a side surface in the direction Y2. The battery pack 190 has the same configuration as the battery pack 47 built in the notebook-type personal computer 40.

A description will now be given of the notebook-type personal computer 40.

Figure 10:
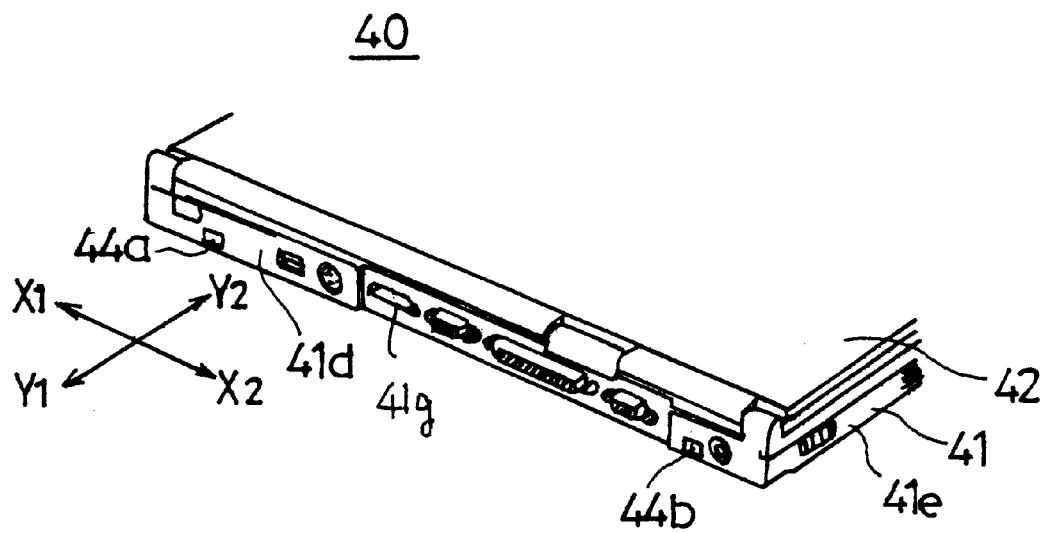
FIG. 10 is a perspective view of a rear side of a notebook-type personal computer shown in FIG. 2.
Figure 11:
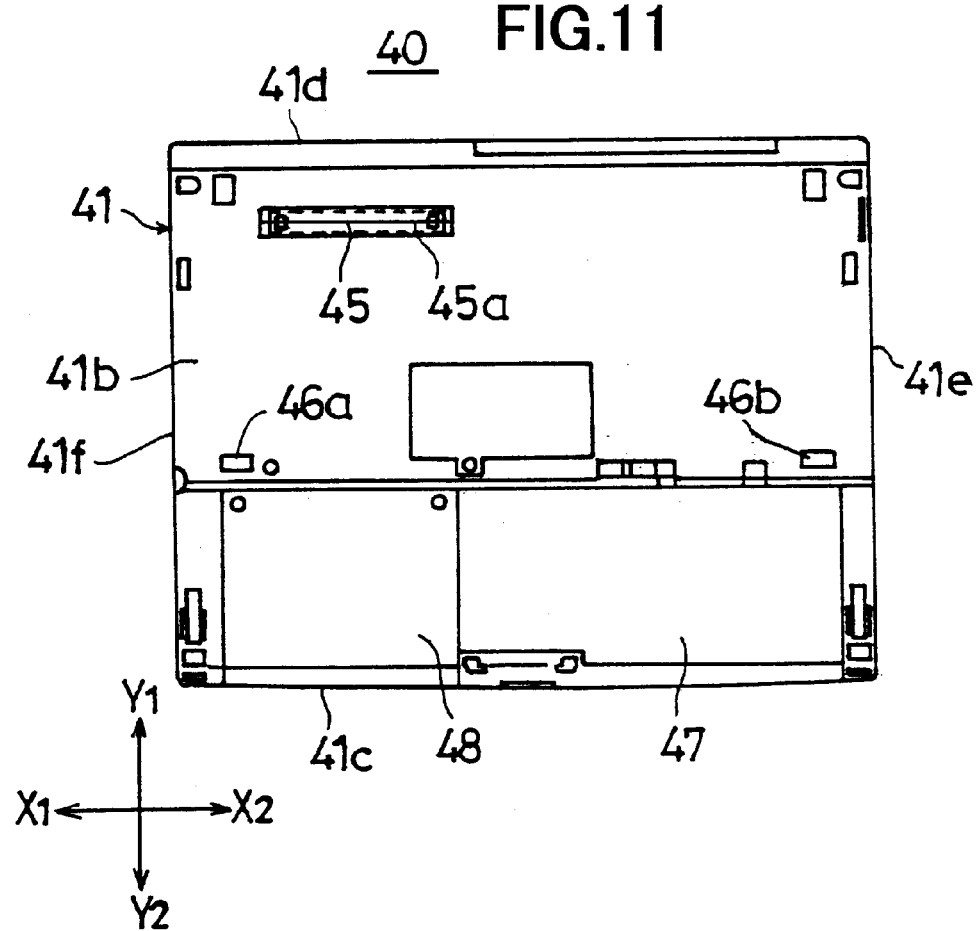
FIG. 11 is a plan view of a bottom surface of the notebook-type personal computer shown in FIG. 2.

As shown in FIG. 2, 10 and 11, the notebook-type personal computer 40 comprises a main body 41 and a liquid crystal display part 42 which is rotatable with respect to the main body 41. The main body 41 has a top surface 41*a*, a bottom surface 41*b*, a front surface 41*c* in the direction Y2, a rear surface 41*d* in the Y1 direction, a side surface 41*e* in the X2 direction and a side surface 41*f* in the direction X1. The top surface 41*a* of the main body 41 is provided with a keyboard part 43. As shown in FIG. 10, the rear surface 41*d* of the main body 41 are provided with engaging recessed parts 44*a* and 44*b* near ends in the directions X1 and X2, respectively. As shown in FIG. 11, the bottom surface 44*b* of the main body 41 is provided with a connector 45 and engaging recessed parts 46*a* and 46*b*. The engaging recessed parts 44*a* and 44*b* are arranged in positions corresponding to the above-mentioned claw parts 80 and 81 of the bay housing 70. The connector 45 is arranged in a position corresponding to the connector 95 of the bay housing 70. The engaging recessed parts 46*a* and 46*b* are arranged in positions corresponding to the claw parts 78 and 79 of the bay housing 70. The connector 45 is covered by a door 45*a* which can be opened by being pressed.

The battery pack 47 and a hard disk drive 48 are built in the main body 41 near the Y2 end on the bottom surface 41*b*.

A description will now be given of the modes of using the bay housing 70.

The bay housing 70 can be used in one of the following seven modes.

Each of FIGS. 12 and 14–18 show a state of the notebook-type personal computer 40 to which the function expansion device 60 is attached. The function expansion device 60 can be constructed by attaching the battery pack 180 to the battery pack accommodating part 74 of the bay housing 70 and inserting into the bay 73 of the bay housing 70 one of the floppy disk drive 110, the CD-ROM drive 130, the magneto-optical disk drive 140, the high-capacity floppy disk drive 150, the digital video disk drive 160 and the hard disk drive 170 which is selected by a user. The thus-constructed function expansion device 60 is mounted to a part of the bottom surface 41*b* which part is near the rear side of the notebook-type personal computer 40 by being engaged with the notebook-type personal computer 40 at four positions. The opening 73*a* of the bay 73 of the bay housing 70 is located on the side of the side surface 41*e* of the notebook-type personal computer 40.

The function expansion device 60 is constructed in one of the following modes.

(1) Expansion Mode 1 (refer to FIG. 12):

FIG. 12 shows the expansion mode 1. The battery pack 190 is attached to the battery pack accommodating part 74, and the floppy disk drive 110 is inserted into the bay 73 through the opening 73*a* until the entire floppy disk drive 110 is accommodated in the bay 73 as shown in FIG. 2. In this state, the connector 111 of the floppy disk drive 110 is connected to the connector 83 of the notebook-type personal computer 40, and the locking depression 117 engages the locking claw 85 of the bay housing 70. Additionally, the insertion opening 116 of the floppy disk drive 110 is positioned on the end in the direction X2.

Figure 19:
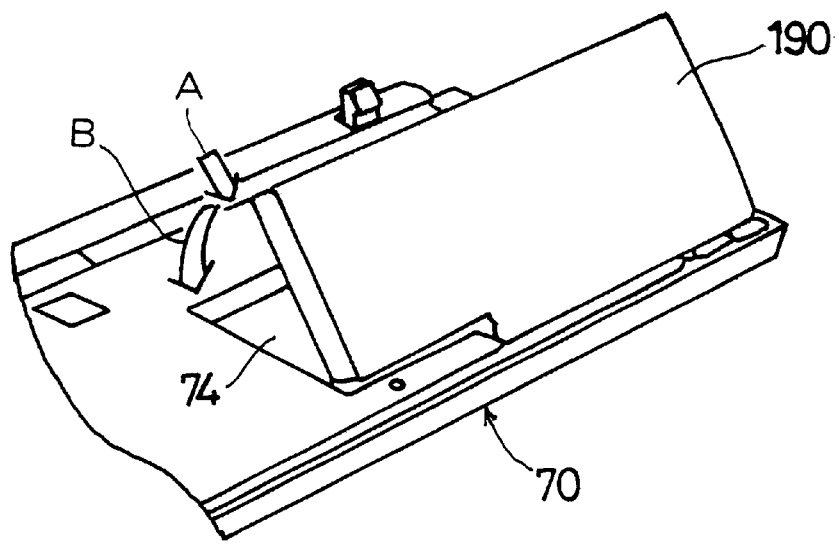
FIG. 19 is a perspective view of a part of a bay housing for explaining an operation for attaching a battery pack to the bay housing.

The battery pack 190 is initially inserted in a diagonal direction into the battery pack accommodating part 74 as indicated by an arrow A in FIG. 19. Then, the battery pack 190 is rotated as shown by an arrow B so as to be accommodated in the battery pack accommodating part 74. In this state, the terminals 192 of the battery pack 190 is connected to the connector 95 of the pay housing 70, and the claw parts 193 and 194 of the battery pack 190 are engaged with the locking claws 97 and 98 of the bay housing 70, respectively.

Figure 20:
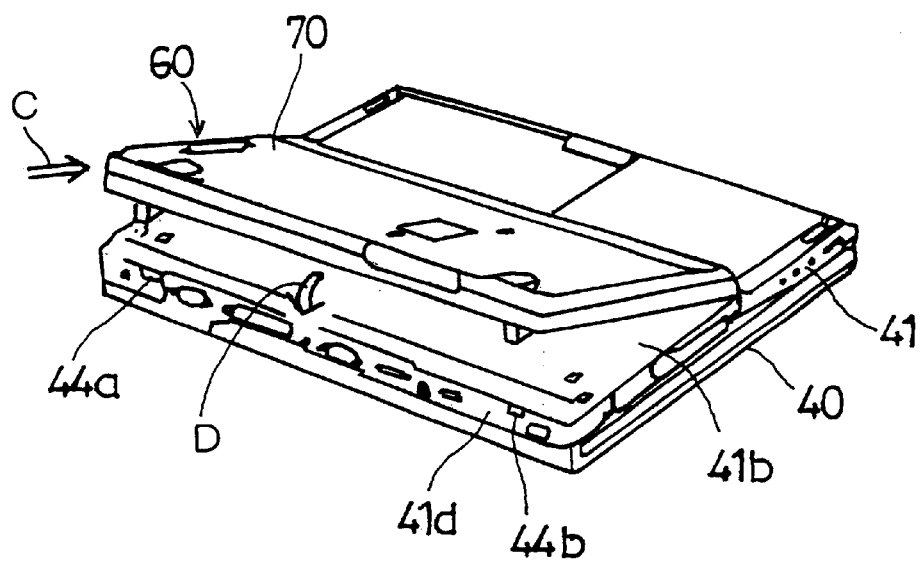
FIG. 20 is a perspective view of the notebook-type personal computer for explaining an operation for attaching the bay housing to the notebook-type personal computer.

The thus-constructed function expansion device 60 is engaged with the bottom surface 41*b* of the notebook-type personal computer 40 in a slanted state as indicated by an arrow C in FIG. 20 so that the claw parts 78 and 79 are fit in the engaging recessed parts 46*a* and 46*b*, respectively. Thereafter, the bay housing 70 is rotated toward the notebook-type personal computer 40 as indicated by an arrow D in FIG. 20. In the process of the rotating operation, the claw parts 80 and 81 are temporarily rotated as shown by double dashed chain lines in FIG. 21 against a spring force of the spring 89, and finally engage with the respective engaging recessed parts 4a and 44*b* by being returned to their original positions by the spring force of the spring 89. The connector 95 presses and opens the door 45*a* and is connected to the connector 45. Thereafter, the operational knob 94 is slide in the direction Y2 so as to lock the operational knob 92.

Figure 21:
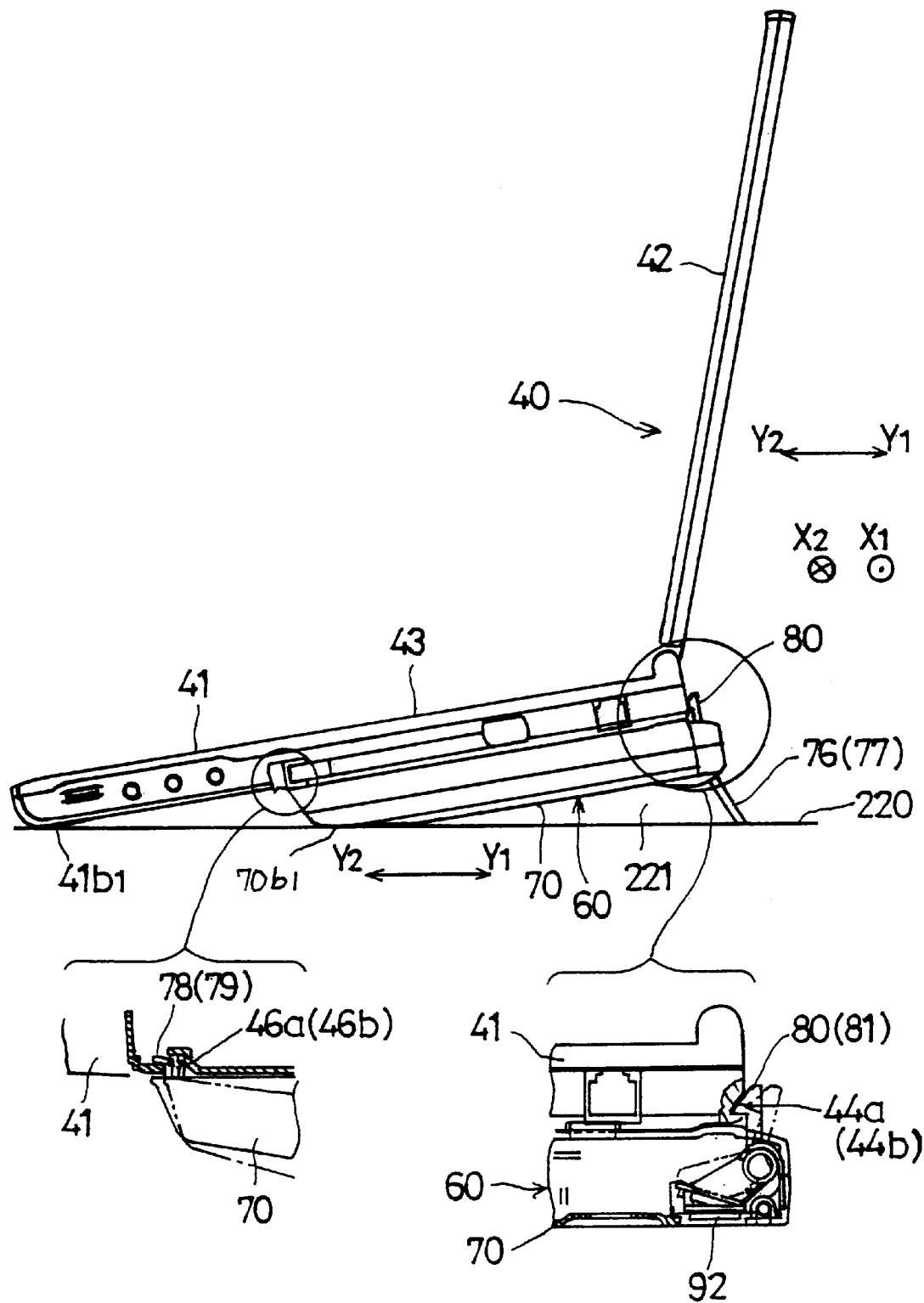
FIG. 21 is side view of the notebook-type personal computer and the function expansion device mounted on the notebook-type personal computer.

The thus-constructed function expansion device 60 is mounted on the notebook-type personal computer 40 as shown in FIG. 21. In the mounted state, the claw parts 78 and 79 are engages with the respective engaging recessed parts 46*a* and 46*b* on the Ys side. Additionally, the claw parts 80 and 81 are engaged with the respective engaging recessed parts 44*a* and 44*b*.

The floppy disk cartridge 115 is inserted into the floppy disk drive 110 through the insertion opening 116 in the direction X1 as shown in FIG. 12.

The notebook-type personal computer 40 and the function expansion device 60 mounted to the notebook-type personal computer 40 are electrically connected as shown in FIG. 3 so that data can be exchanged between the notebook-type personal computer 40 and the floppy disc drive 110. The battery pack 190 supplies a power to both the floppy disk drive 110 and the notebook-type personal computer 40.

It should be noted that the bay housing 70 may be mounted to the notebook-type personal computer 40 first, and then the floppy disk drive 110 is inserted into the bay 73.

(2) Expansion Mode 2 (Refer to FIG. 14)

FIG. 14 shows the expansion mode 2. In FIG. 14, the CD-ROM drive 130 is attached to the bay 73 of the bay housing 70. In this state, the CD-ROM drive 130 is locked by the locking claw 85, and the connector 131 of the CD-ROM drive 130 is connected to the connector 83 of the bay housing 70. The CD-ROM 135 is attached to the CD-ROM drive 130 in the bay 73. The notebook-type personal computer 40 and the function expansion device 60 mounted to the notebook-type personal computer 40 are electrically connected as shown in FIG. 3 so that data can be exchanged between the notebook-type personal computer 40 and the CD-ROM drive 130.

(3) Expansion Mode 3 (Refer to FIG. 15)

FIG. 14 shows the expansion mode 3. In FIG. 15, the magneto-optical disk drive 140 is attached to the bay 73 of the bay housing 70. In this state, the magneto-optical disk drive 140 is locked by the locking claw 85, and the connector 141 of the magneto-optical disk drive 140 is connected to the connector 83 of the bay housing 70. The magneto-optical disk cartridge 145 is attached to the magneto-optical disk drive 140 in the bay 73. The notebook-type personal computer 40 and the function expansion device 60 mounted to the notebook-type personal computer 40 are electrically connected as shown in FIG. 3 so that data can be exchanged between the notebook-type personal computer 40 and the magneto-optical disk drive 140.

(4) Expansion Mode 4 (Refer to FIG. 16)

FIG. 16 shows the expansion mode 4. In FIG. 16, the high-capacity floppy disk drive 150 is attached to the bay 73 of the bay housing 70. In this state, the high-capacity floppy disk drive 150 is locked by the locking claw 85, and the connector 151 of the high-capacity floppy disk drive 150 is connected to the connector 83 of the bay housing 70. The high-capacity floppy disk cartridge 155 is attached to the high-capacity floppy disk drive 150 in the bay 73. The notebook-type personal computer 40 and the function expansion device 60 mounted to the notebook-type personal computer 40 are electrically connected as shown in FIG. 3 so that data can be exchanged between the notebook-type personal computer 40 and the high-capacity floppy disk drive 150.

(5) Expansion Mode 5 (Refer to FIG. 17)

FIG. 17 shows the expansion mode 5. In FIG. 17, the digital video disk drive 160 is attached to the bay 73 of the bay housing 70. In this state, the digital video disk drive 160 is locked by the locking claw 85, and the connector 161 of the digital video disk 160 is connected to the connector 83 of the bay housing 70. The digital video disk 165 is attached to the digital video disk drive 160 in the bay 73. The notebook-type personal computer 40 and the function expansion device 60 mounted to the notebook-type personal computer 40 are electrically connected as shown in FIG. 3 so that data can be exchanged between the notebook-type personal computer 40 and the digital video disk drive 160.

(6) Expansion Mode 6 (Refer to FIG. 18)

FIG. 18 shows the expansion mode 6. In FIG. 18, the hard disk drive 170 is attached to the bay 73 of the bay housing 70. In this state, the hard disk drive 170 is locked by the locking claw 85, and the connector 171 of the hard disk drive 170 is connected to the connector 83 of the bay housing 70. The notebook-type personal computer 40 and the function expansion device 60 mounted to the notebook-type personal computer 40 are electrically connected as shown in FIG. 3 so that data can be exchanged between the notebook-type personal computer 40 and the hard disk drive 170.

It should be noted that the mode of expansion can be changed by changing one of the drive units, for example, the floppy disk drive 110 attached to the bay 73 to another one of the drive units, for example, the CD-ROM 130 in a state in which the bay housing 70 is mounted to the notebook-type personal computer 40.

Figure 22:
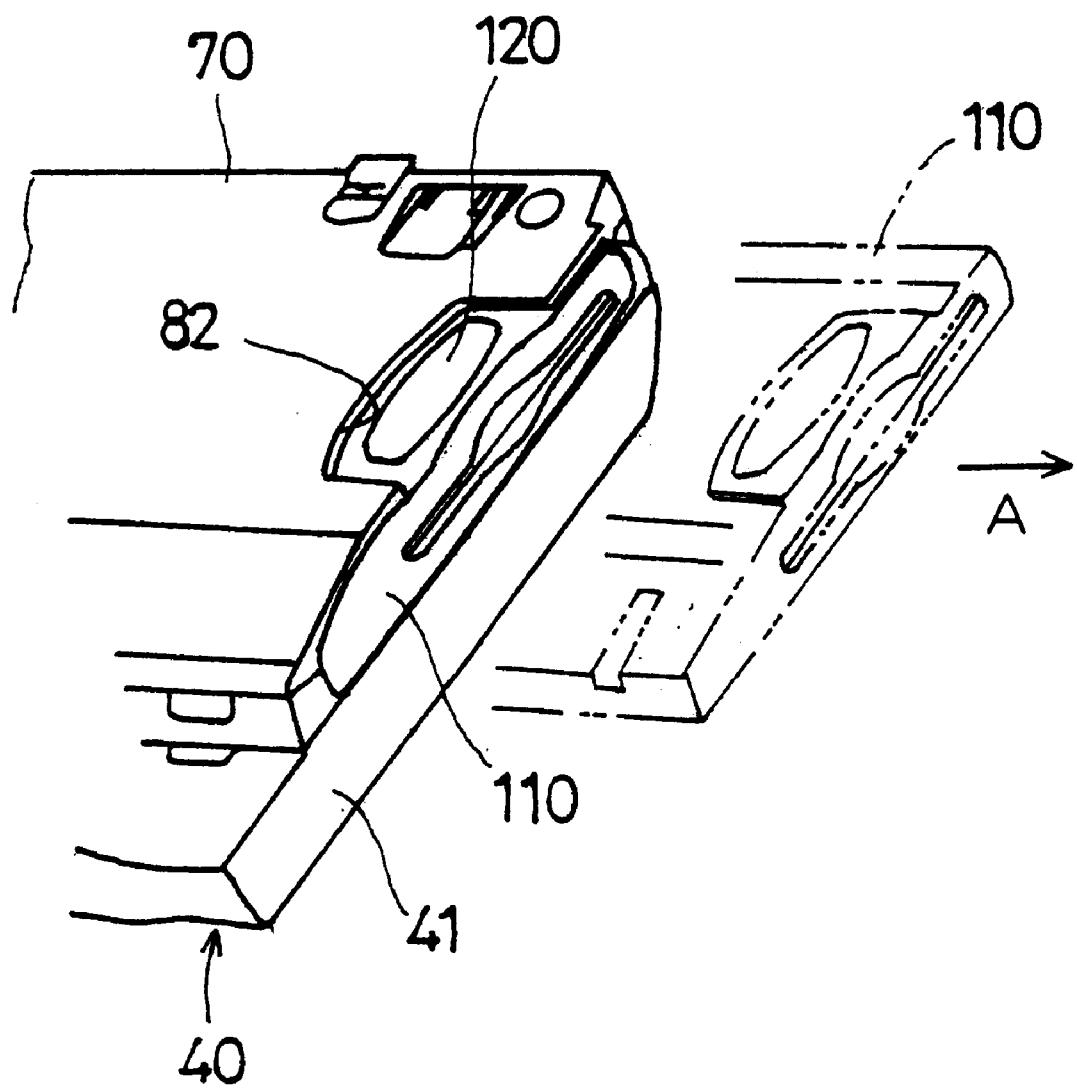
FIG. 22 is a perspective view of a part of the bay housing for explaining a removing operation of the floppy disk drive.

In order to remove the floppy disk from the bay housing 70, the unlocking knob 86 is slid in the direction Y1 so as to unlock the locking mechanism 84. Thereafter, the floppy disk drive 110 can be easily removed from the bay 73 by strongly pressing a finger onto the finger engaging part 120 exposed through the notch window 82 and pulling the floppy disk drive 110 in a direction indicated by an arrow A shown in FIG. 22. the CD-ROM drive 130, for example, can be attached to the bay 73 by simply inserting it into the bay 73. Accordingly, the operation for changing the mode of expansion is easy.

Figure 23:
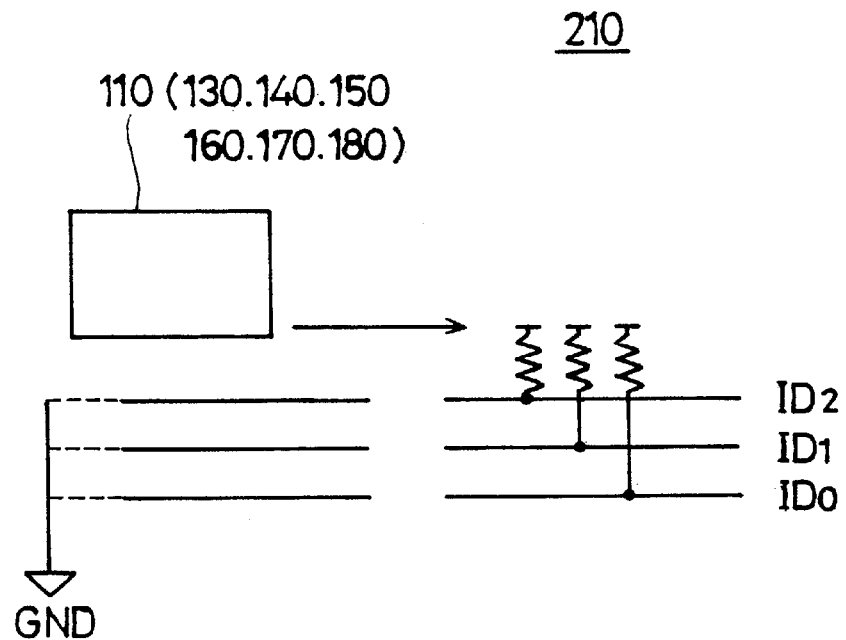
FIG. 23 is diagram for explaining a discriminating circuit.

A discriminating unit 210 shown in FIG. 23 iscriminates one of the floppy disk drive 110, the D-ROM drive 130, the magneto-optical disk drive 140, the high-capacity floppy disk drive 150, the digital video disk drive 160, the hard disk drive 170 and the AC/DC adapter 180 which one is attached to the bay housing 70. The discriminating unit 210 has three ID lines ID1, ID2 and ID3 so that one of the lines connected to the ground differs from drive to drive which is attached to the bay housing 70. That is, each of the eight types of the drive units can be discriminated based on a combination of a high signal "1" and a low signal "0" of the three ID lines Id1, ID2 and ID3. More specifically, for example, when the floppy disk drive 110 is attached to the bay housing 70, the signal level of the ID lines becomes "001" whereas the signal level becomes "000" when the CD-ROM drive 130 is attached to the bay housing 70.

It should be noted that since the operational knob 92 is locked by the operational knob 94, the bay housing 70 cannot be unintentionally removed from the notebook-type personal computer 40. The bay housing 70 can only be removed from the notebook-type personal computer 40 by sliding the operational knob 94 in the direction Y1 so as to unlock the operational knob 92 and disengaging the claw parts 80 and 81 from the respective engaging recessed parts 44a and 44b by pressing the operational knob 92.

A description will now be given of a state of the notebook-type personal computer 40 placed on a table with a mode of expansion.

Figure 24:
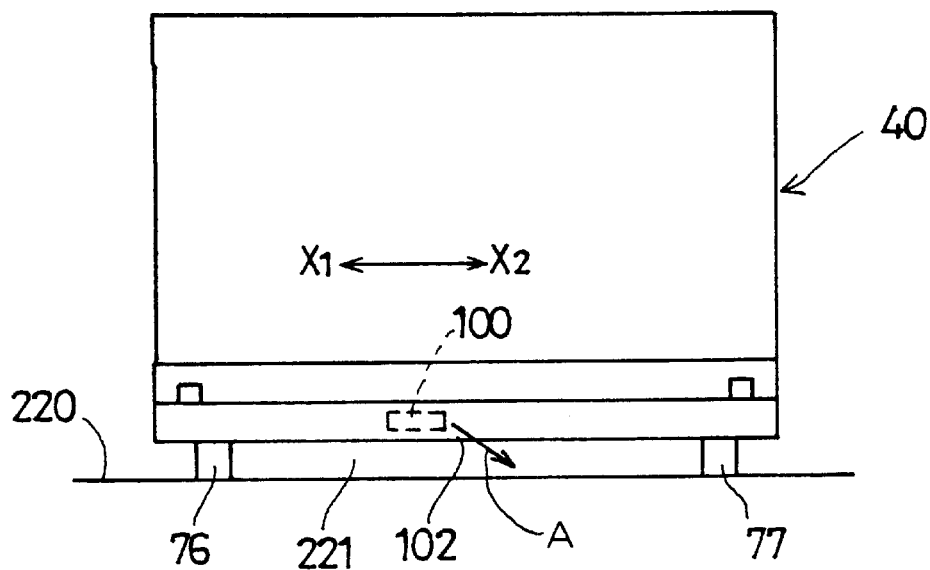
FIG. 24 is an illustration of the notebook-type personal computer with the function expansion device mounted to the notebook-type personal computer.

The notebook-type personal computer 40 can be placed on a surface 220 of a table in a tilted state as shown in FIGS. 21 and 24. In the state shown in FIGS. 21 and 24, the tilting legs 76 and 77 are raised so that the notebook-type personal computer 40 is supported by the tilting legs 76 and 77, the slanting surface 70b1 and a part 41b1 of the bottom surface 41b of the main body 41 of the notebook-type personal computer 40. In this state, the keyboard part 43 of the notebook-type personal computer 40 is slightly slanted so as to facilitate a key operation. That is, the bay housing 70 can serve as a stand for the notebook-type personal computer 40 when the tilting legs 76 and 77 are raised.

The bay housing 70 is separated from the surface 220 of the table so that a space 221 is formed between the bottom surface 70b of the bay housing 70 and the surface 220 of the table. Additionally, as shown in FIG. 24, when the cooling fan 100 is operated, air is outlet through the ventilation opening 102 in a diagonal direction as indicated by an arrow A. Accordingly, the space 221 is efficiently ventilated. Thus, heat under the bottom surface 70b of the bay housing 70 is efficiently released, and the function expansion device 60 (the bay housing 70) can be efficiently cooled. If the cooling fan 100 is a type which draws air through ventilation opening 102, the air in the space 221 is also efficiently exchanged, and, thereby the function expansion device 60 can be efficiently cooled. It should be noted that if the cooling fan 100 is not provided and only the ventilation opening 102 is formed, a heat if released from the bottom surface 70b of the bay housing 70 by natural cooling.

It is also be noted that the bay housing 70 may be used without raising the tilting legs 76 and 77 and the entire bottom surface 70b is made contact with the surface 220 of the table so that the bay housing 70 is used as a stand for supporting the notebook-type personal computer 40. In the above-mentioned structure of the bay housing, since the tilting legs 76 and 77 are raised only when it is necessary, the entire thickness (height) of the function expansion device 60 can be smaller than when the entire bottom surface 70b of the bay housing 70 is inclined with respect to the notebook-type personal computer 40.

A description will now be given, with reference to FIGS. 25 and 26, of accommodation of the AC/DC adapter 180.

Figure 25:
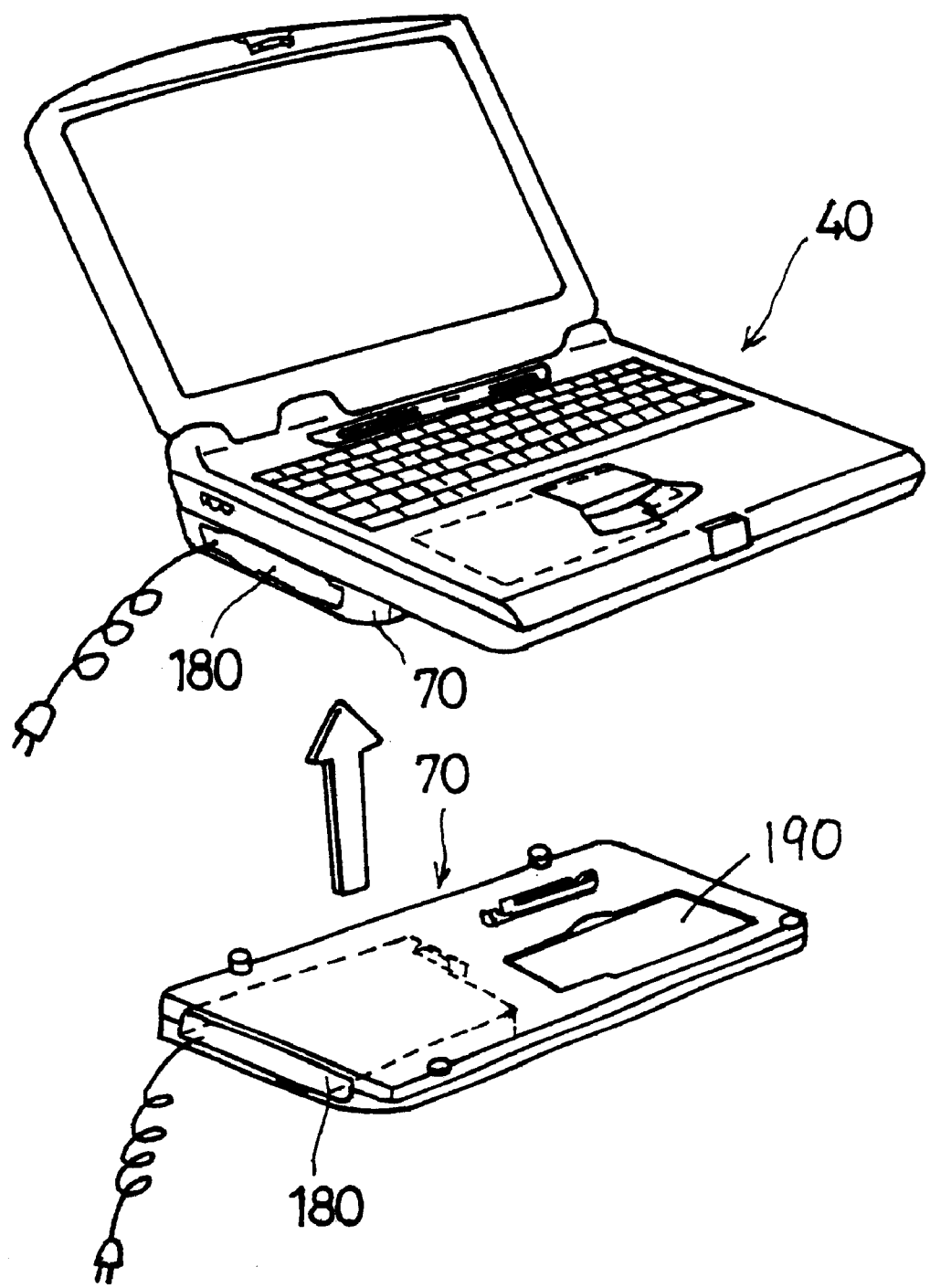
FIG. 25 is a perspective view of the notebook-type personal computer for explaining an operation for attaching the bay housing provided with a battery pack.

As shown in FIG. 25, the AC/DC adapter 180 is carried together with the bay housing 70 in a state in which the AC/DC adapter 180 is accommodated in the bay 73 of the bay housing 70. Accordingly, a good portability can be provided as compared to a case in which the AC/DC adapter 180 is carried separately from the bay housing 70.

The bay housing 70 in which the AC/DC adapter 180 is accommodated is mounted to the notebook-type personal computer 40 as shown in FIG. 23. Accordingly, the notebook-type personal computer 40 can be operated by a commercially available power source.

Figure 26:
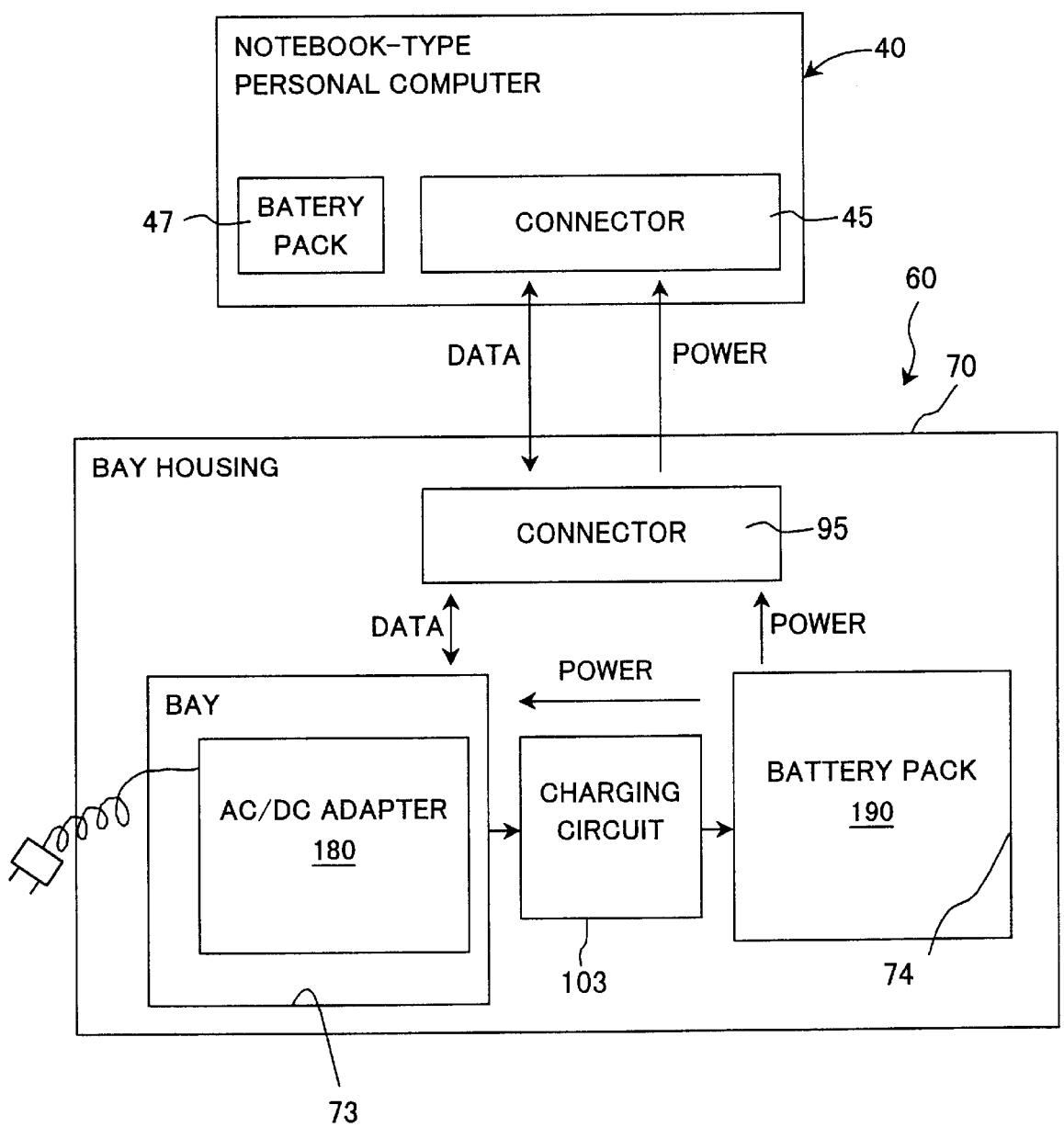
FIG. 26 is an illustration for explaining an electrical connection between the function expansion device provided with the battery pack and the notebook-type personal computer shown in FIG. 2.

Additionally, as shown in FIG. 26, an AC voltage of the commercially available power source is converted into a DC voltage by the charging circuit 103 so as to charge the battery pack 190 accommodated in the battery pack accommodating part 74. It should noted that the battery pack 190 can be charged in a state in which the bay housing 70 is separated from the notebook-type personal computer 40. Accordingly, the bay housing 70 can serve as a charger by accommodating the AC/DC adapter 180. Additionally, the battery pack 47 of the notebook-type personal computer 40 can be charged by using the AC/DC adapter 180.

Since the battery pack 190 is identical to the battery pack 47 of the notebook-type personal computer 40, the battery pack 190 can be used as the battery pack 47 of the notebook-type personal computer 40 after a power of the battery pack 47 has been completely consumed by removing the battery pack 47 from the notebook-type personal computer 40 and attaching the battery pack 190 to the notebook-type personal computer 40.

Additionally, the charge circuit 103 may be provided in the AC/DC adapter 180. In such a case, the battery pack 47 of the notebook-type personal computer 40 can be charged without providing a charging circuit in the main body of the notebook-type personal computer 40.

It should be noted that the bay housing 70 may be connected to the notebook-type personal computer by a cable. Additionally, the charging circuit 103 may be provided outside the bay housing 70 so that a housing of the charging circuit 103 may be provided under the bay housing 70. In such a case, the housing of the charging circuit 103, the bay housing 70 (the function expansion device 60) and the notebook-type personal computer 40 are mounted one on another in that order.

The present invention is not limited to the specifically disclosed embodiments, and variations and modification may be made without departing from the scope of the present invention.

The present application is based on Japanese priority application No.10-260602 filed on Sep. 14, 1998, the entire contents of which are hereby incorporated by reference.

What is claimed is:

1. A function expansion device having a unit accommodating part, expanding a function of a portable electronic device by being detachably attached to said portable electronic device, said function expansion device comprising:
    a functional unit attached to the unit accommodating part and coupled to a connector provided inside of said portable electronic device, wherein said unit accommodating part has a concave part formed on an inside thereof to removably accommodate said functional unit, and said functional unit alone provides a complete function to be added to said portable electronic device.

2. The function expansion device as claimed in claim 1, further comprising:
    a battery accommodating part which accommodates a battery pack for providing an electric power to at least one of said portable electronic device and said functional unit accommodated in said unit accommodating part.

3. The function expansion device as claimed in claim 2, further comprising:
    a charging circuit charging said battery pack accommodated in said battery accommodating part.

4. The function expansion device as claimed in claim 2, wherein said battery accommodating part has a configuration the same as that of a battery accommodating part of said portable electronic device so that a battery pack used for said portable electronic device is used as said battery pack to be accommodated in said battery accommodating part of said function expansion device.

5. The function expansion device as claimed in claim 1, wherein said functional unit is an adapter which converts a commercially available voltage into a voltage used by said portable electronic device.

6. The function expansion device as claimed in claim 5, wherein said adapter includes a charging circuit for charging a battery pack provided in said function expansion device.

7. The function expansion device as claimed in claim 1, further comprising:
    a cooling unit for cooling an interior of said function expansion device.

8. The function expansion device as claimed in claim 1, further comprising:
    a member which adjusts an angle of said portable electronic device when said function expansion device is mounted to said portable electronic device, the angle being formed between a bottom surface of said function expansion device and a surface on which said portable electronic device is placed.

9. The function expansion device as claimed in claim 1, wherein an outer configuration of said function expansion device is formed so that an operation performed by a user on said portable electronic device is facilitated by the outer configuration of said function expansion device.

10. An electronic device system comprising:
    an electronic device;
    a plurality of functional units each of which alone provides a complete function to be added to said electronic device; and
    a function expansion device directly connected with a connector provided inside said electronic device, said function expansion device including a unit accommodating part which is detachably attached to said electronic device and includes a concave part formed in the unit accommodating part to thereby removably accommodate an entire one of said functional units.

11. A functional unit alone providing a complete function to be added to an electronic device, said functional unit being detachably attached to an attachment which is detachably mounted to said electronic device, and said attachment includes a concave part formed in said attachment to thereby removably accommodate the entire functional unit which is detachably attached to said electronic device.

12. The functional unit as claimed in claim 11, further comprising:
    a converter which converts a commercially available voltage into a voltage suitable for driving said electronic device.

13. The functional unit as claimed in claim 12, further comprising:
    a charging circuit for charging a battery pack provided in said attachment so that the battery pack is charged by using the commercially available voltage.

14. An apparatus comprising:
    a bay housing unit directly connected to a connector provided inside an electronic device; and
    a functional unit providing a function to be added to said electronic device, said functional unit being detachably mounted within said bay housing unit.

15. An apparatus according to claim 14, further comprising:
   a battery pack attached to said bay housing unit providing an electric power to at least one of said electronic device and said functional unit.

16. An apparatus according to claim 15, further comprising:
   a charging circuit charging said battery pack attached to said bay housing unit.

17. An apparatus according to claim 15, wherein said bay housing unit has a configuration for said battery pack the same as that of a battery pack of said electronic device so that the battery pack used for said electronic device is used as said battery pack in said bay housing unit.

18. An apparatus according to claim 14, wherein said functional unit is an adapter which converts a commercially available voltage into a voltage used by said electronic device.

19. An apparatus according to claim 18, wherein said adapter includes a charging circuit for charging a battery pack provided in said bay housing unit.

20. An apparatus according to claim 14, further comprising:
   a cooling unit cooling an interior of said bay housing unit.

21. An apparatus according to claim 14, further comprising:
   a member adjusting an angle of said electronic device when said bay housing unit is mounted within said electronic device, the angle being formed between a bottom surface of said bay housing unit and a surface on which said electronic device is placed.

22. An apparatus according to claim 14, wherein an outer configuration of said bay housing unit is formed so that an operation performed by a user on said electronic device is facilitated by the outer configuration of said bay housing unit.

* * * * *